United States Patent
Kotake et al.

(10) Patent No.: US 9,025,857 B2
(45) Date of Patent: May 5, 2015

(54) THREE-DIMENSIONAL MEASUREMENT APPARATUS, MEASUREMENT METHOD THEREFOR, AND COMPUTER-READABLE STORAGE MEDIUM

(75) Inventors: Daisuke Kotake, Yokohama (JP); Shinji Uchiyama, Yokohama (JP)

(73) Assignee: Canon Kabushiki Kaisha, Tokyo (JP)

(\*) Notice: Subject to any disclaimer, the term of this patent is extended or adjusted under 35 U.S.C. 154(b) by 1003 days.

(21) Appl. No.: 12/818,538

(22) Filed: Jun. 18, 2010

(65) Prior Publication Data

US 2010/0328682 A1 Dec. 30, 2010

(30) Foreign Application Priority Data

Jun. 24, 2009 (JP) ................................. 2009-150323

(51) Int. Cl.
*G06K 9/00* (2006.01)
*G01B 11/25* (2006.01)
*G06T 7/00* (2006.01)

(52) U.S. Cl.
CPC .............. *G01B 11/25* (2013.01); *G06T 7/0057* (2013.01)

(58) Field of Classification Search
None
See application file for complete search history.

(56) References Cited

U.S. PATENT DOCUMENTS

| | | | | |
|---|---|---|---|---|
| 5,893,085 | A * | 4/1999 | Phillips et al. | 706/52 |
| 6,204,916 | B1 * | 3/2001 | Norita et al. | 356/141.1 |
| 6,792,370 | B2 | 9/2004 | Satoh et al. | |
| 6,993,450 | B2 | 1/2006 | Takemoto et al. | |
| 7,013,040 | B2 * | 3/2006 | Shiratani | 382/154 |
| 7,027,639 | B2 * | 4/2006 | Fishbaine | 382/150 |
| 7,028,723 | B1 * | 4/2006 | Alouani et al. | 141/83 |
| 7,130,754 | B2 | 10/2006 | Satoh et al. | |
| 7,502,504 | B2 * | 3/2009 | Ban et al. | 382/152 |
| 7,664,341 | B2 | 2/2010 | Takemoto et al. | |
| 8,164,625 | B2 * | 4/2012 | Klawunder | 348/125 |
| 8,189,183 | B2 * | 5/2012 | Shih et al. | 356/237.1 |
| 8,218,903 | B2 * | 7/2012 | Osman | 382/285 |
| 8,334,985 | B2 * | 12/2012 | Sho et al. | 356/601 |
| 8,363,929 | B2 * | 1/2013 | Kojima et al. | 382/154 |
| 2001/0043719 | A1 * | 11/2001 | Harakawa et al. | 382/106 |
| 2002/0020747 | A1 * | 2/2002 | Wakamiya et al. | 235/462.11 |
| 2002/0075456 | A1 * | 6/2002 | Shiratani | 353/31 |

(Continued)

OTHER PUBLICATIONS

Brown et al. "Feature Detection and Matching" Recognizing Panoramas, ICCV, 2003 pp. 1-38.*

(Continued)

*Primary Examiner* — Chan Park
*Assistant Examiner* — Mia M Thomas
(74) *Attorney, Agent, or Firm* — Fitzpatrick, Cella, Harper & Scinto

(57) ABSTRACT

A three-dimensional measurement apparatus includes a model holding unit configured to hold a three-dimensional shape model of a measurement object and a determination unit configured to determine a distance measurement region on the measurement object based on information indicating a three-dimensional shape of the measurement object. The measurement object is irradiated with a predetermined illumination pattern by an illumination unit. An image of the measurement object is sensed while the illumination unit irradiates the measurement object. Distance information indicating a distance from the image sensing unit to the measurement object is calculated based on region corresponding to the distance measurement region within the sensed image. A position and orientation of the measurement object is calculated based on the distance information and the three-dimensional shape model.

12 Claims, 15 Drawing Sheets

(56) References Cited

U.S. PATENT DOCUMENTS

| | | | |
|---|---|---|---|
| 2002/0186879 A1* | 12/2002 | Hemar et al. | 382/149 |
| 2002/0191834 A1* | 12/2002 | Fishbaine | 382/150 |
| 2003/0123707 A1* | 7/2003 | Park | 382/106 |
| 2004/0081352 A1* | 4/2004 | Ban et al. | 382/154 |
| 2005/0025353 A1* | 2/2005 | Kaneko et al. | 382/152 |
| 2005/0162419 A1* | 7/2005 | Kim et al. | 345/419 |
| 2006/0078222 A1* | 4/2006 | Hwang | 382/274 |
| 2006/0165293 A1* | 7/2006 | Hamanaka | 382/209 |
| 2006/0178849 A1* | 8/2006 | Maier et al. | 702/66 |
| 2006/0187470 A1* | 8/2006 | Massey et al. | 356/614 |
| 2006/0210132 A1* | 9/2006 | Christiansen et al. | 382/128 |
| 2007/0090309 A1* | 4/2007 | Hu et al. | 250/559.45 |
| 2007/0092161 A1 | 4/2007 | Aratani et al. | |
| 2007/0104353 A1* | 5/2007 | Vogel | 382/106 |
| 2007/0242899 A1 | 10/2007 | Satoh et al. | |
| 2007/0253612 A1* | 11/2007 | Katayama et al. | 382/128 |
| 2008/0075234 A1* | 3/2008 | Seijbel et al. | 378/207 |
| 2008/0075324 A1* | 3/2008 | Sato et al. | 382/106 |
| 2008/0144925 A1* | 6/2008 | Zhu et al. | 382/154 |
| 2008/0152214 A1* | 6/2008 | Sawachi | 382/154 |
| 2008/0279446 A1* | 11/2008 | Hassebrook et al. | 382/154 |
| 2008/0309913 A1* | 12/2008 | Fallon | 356/4.01 |
| 2009/0262113 A1 | 10/2009 | Kotake et al. | |
| 2010/0034426 A1* | 2/2010 | Takiguchi et al. | 382/106 |
| 2010/0046801 A1* | 2/2010 | Ishiyama | 382/106 |
| 2010/0091110 A1* | 4/2010 | Hildreth | 348/169 |
| 2010/0092032 A1* | 4/2010 | Boca | 382/103 |
| 2010/0092041 A1* | 4/2010 | Kim et al. | 382/106 |
| 2010/0142826 A1 | 6/2010 | Kotake et al. | |
| 2010/0231690 A1* | 9/2010 | Fujieda et al. | 348/47 |
| 2010/0231721 A1* | 9/2010 | Meloche et al. | 348/159 |
| 2010/0232683 A1* | 9/2010 | Fujieda et al. | 382/154 |
| 2010/0277572 A1* | 11/2010 | Nakamura et al. | 348/50 |
| 2010/0289797 A1* | 11/2010 | Tateno et al. | 345/419 |
| 2010/0324737 A1* | 12/2010 | Handa et al. | 700/259 |
| 2011/0069204 A1* | 3/2011 | Vakrat et al. | 348/234 |
| 2011/0157178 A1* | 6/2011 | Tuzel et al. | 345/426 |
| 2012/0275688 A1* | 11/2012 | Stainlay et al. | 382/154 |

OTHER PUBLICATIONS

T. Drummond, et al., "Real-time visual tracking of complex structures", IEEE Transactions on Pattern Analysis and Machine Intelligence, vol. 24, No. 7, pp. 932-946 (2002).

D.A. Simon et al., "Real-time 3-D pose estimation using a high-speed range sensor", Proc. 1994 IEEE International Conference on Robotics and Automation (ICRA '94), pp. 2235-2241 (1994).

Y. Hel-Or et al., "Pose estimation by fusing noisy data of different dimensions", IEEE Transactions on Pattern Analysis and Machine Intelligence, vol. 17, No. 2, pp. 195-201 (1995).

Hiura et al., "Real-time tracking of free-form objects by range and intensity image fusion", The Transactions of the Institute of Electronics, Information and Communication Engineers D-II, vol. J80-D-11, No. 11, pp. 2904-2911, (1997).

L. Vacchetti, et al., "Combining edge and texture information for real-time accurate 3D camera tracking", Proc. ISMAR04, pp. 48-57, (2004).

E. Tola, et al., "A fast local descriptor for dense matching", Proc. CVPR'08, pp. 1-8, (2008).

X. Jiang, et al., "Range Image Segmentation: Adaptive Grouping of Edges into Regions", Computer Vision, ACCV '98, pp. 299-306, (1998).

U.S. Appl. No. 12/763,672 filed Apr. 20, 2010, Naohito Nakamura, et al.

U.S. Appl. No. 12/778,385 filed May 12, 2010, Keisuke Tateno, et al.

* cited by examiner

FIG. 2C

| POINT | X | Y | Z |
|---|---|---|---|
| P1 | 200 | 200 | 0 |
| P2 | 200 | 200 | 150 |
| P3 | 100 | 200 | 150 |
| P4 | 100 | 200 | 350 |
| P5 | 200 | 200 | 350 |
| P6 | 200 | 200 | 500 |
| P7 | 0 | 200 | 500 |
| P8 | 0 | 200 | 0 |
| P9 | 0 | 100 | 0 |
| P10 | 0 | 100 | 500 |
| P11 | 0 | 0 | 500 |
| P12 | 0 | 0 | 0 |
| P13 | 200 | 0 | 0 |
| P14 | 200 | 0 | 500 |

FIG. 2D

| LINE SEGMENT | TWO POINTS AT TWO ENDS |
|---|---|
| L1 | P1-P6 |
| L2 | P2-P3 |
| L3 | P3-P4 |
| L4 | P4-P5 |
| L5 | P6-P7 |
| L6 | P7-P11 |
| L7 | P11-P12 |
| L8 | P12-P13 |
| L9 | P1-P13 |
| L10 | P8-P12 |
| L11 | P9-P10 |
| L12 | P7-P8 |
| L13 | P1-P8 |
| L14 | P13-P14 |
| L15 | P6-P14 |
| L16 | P11-P14 |

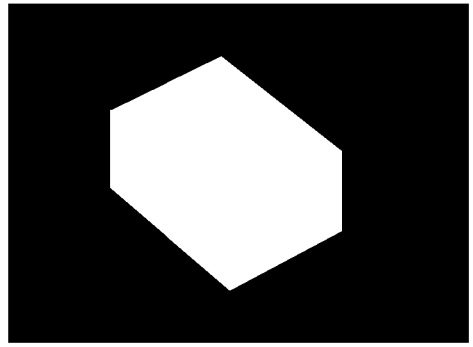
FIG. 4A  SEPARATION BETWEEN BACKGROUND AND OBJECT (MASK IMAGE)
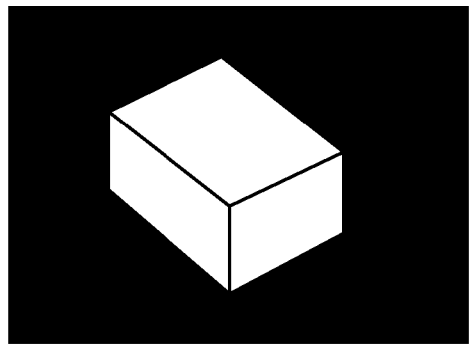
FIG. 4B  RENDERING OF LINE SEGMENTS
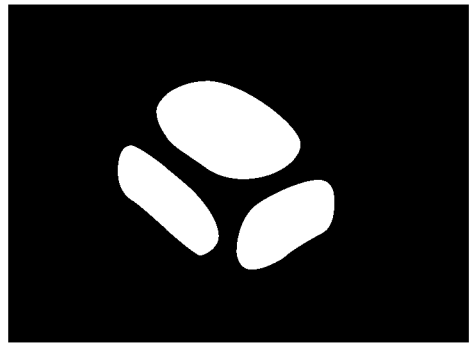
FIG. 4C  UPDATING OF MASK IMAGE

THREE-DIMENSIONAL MEASUREMENT APPARATUS, MEASUREMENT METHOD THEREFOR, AND COMPUTER-READABLE STORAGE MEDIUM

BACKGROUND OF THE INVENTION

1. Field of the Invention

The present invention relates to a three-dimensional measurement apparatus, a measurement method therefor, and a computer-readable storage medium.

2. Description of the Related Art

In recent years, it is becoming a common practice to perform complex tasks using robots in place of humans. A typical example of such complex tasks is assembly of industrial products. For example, to grip a component by an end effector such as a hand of a robot, it is necessary to measure the relative position and orientation between the component and the robot (hand), work out a movement plan based on the obtained measurement result, and control an actuator. Such position and orientation measurement is necessary not only in gripping a component by a robot, but also in various situations such as self-position estimation of the robot in its autonomous movement.

A two-dimensional image (density image/color image) obtained by a camera or a range image obtained by a range sensor is commonly used for the above-mentioned position and orientation measurement. "T. Drummond and R. Cipolla, "Real-time visual tracking of complex structures," IEEE Transactions on Pattern Analysis and Machine Intelligence, vol. 24, no. 7, pp. 932-946, 2002. (to be referred to as "Reference 1" hereinafter)" mentions a technique for measuring the position and orientation of an object by representing a three-dimensional shape model of the object using a set of line segments (wire-frame model), and fitting a projected image of three-dimensional line segments to edges detected on a two-dimensional image. Also, D. A. Simon, M. Hebert, and T. Kanade, "Real-time 3-D pose estimation using a high-speed range sensor," Proc. 1994 IEEE International Conference on Robotics and Automation (ICRA '94), pp. 2235-2241, 1994. (to be referred to as "Reference 2" hereinafter) mentions a technique for measuring the position and orientation of an object by fitting a three-dimensional shape model (polygon model) of the object to a three-dimensional point cloud on the object surface obtained from a range image.

Known methods of acquiring a range image are passive measurement which requires no special illumination, and active measurement in which an object is irradiated in a special pattern for measurement. In general passive measurement, images of an object are sensed by two or more cameras, and the distance of each pixel is calculated in accordance with the triangulation principle based on associations between the respective images. In general active measurement, an object is irradiated with, for example, slit light or two-dimensional pattern light, and the distance of each pixel is measured in accordance with the triangulation principle. Another known active measurement is of the TOF (Time-of-Flight) scheme which uses the time taken for emitted light to travel to an object and be reflected back by the surface of the object.

Position and orientation measurement which uses a two-dimensional image is performed by minimizing the distance between an image feature and a projected image of a three-dimensional shape model "on a two-dimensional image". For this reason, the measurement accuracy in this measurement method is not always high and is even low especially for a position component of a camera in the direction of depth. In contrast, position and orientation measurement which uses a range image is performed by minimizing the distance between a three-dimensional point cloud and a three-dimensional shape model "in a three-dimensional space". For this reason, the measurement accuracy in this measurement method is higher than the method which uses a two-dimensional image, but the degree of freedom of a certain component cannot be measured with high accuracy if an object (e.g., a two-dimensional object) has a less distinctive shape.

Under the circumstances, it a demand exists to improve the measurement accuracy of the position and orientation by complementarily using a two-dimensional image and a range image. For example, since a large number of edges (image features) can be detected on a two-dimensional image in portions where changes in density are remarkable, such as the boundary between the background and the object and the positions of shifts between the planes, a two-dimensional image is desirably used in these portions. In contrast, since the distances can be stably measured in even portions where image features are hard to detect, a range image is desirably used in these portions.

In relation to these techniques, "Y. Hel-Or and M. Werman, "Pose estimation by fusing noisy data of different dimensions," IEEE Transactions on Pattern Analysis and Machine Intelligence, vol. 17, no. 2, pp. 195-201, 1995. (to be referred to as "Reference 3" hereinafter)" discloses a method of measuring the position and orientation of an object by processing features on a two-dimensional image as three-dimensional points with indefinite depths. Also, "Hiura, Yamaguchi, Sato, and Inokuchi, "Real-time tracking of free-form objects by range and intensity image fusion," The Transactions of the Institute of Electronics, Information and Communication Engineers D-II, vol. J80-DII, no. 11, pp. 2904-2911, 1997. (to be referred to as "Reference 4" hereinafter)" discloses a method of measuring the position and orientation using pieces of gradient information of a two-dimensional density image and range image without explicit feature detection from a two-dimensional image.

An operation for assembling industrial products is expected to speed up by using robots. For example, it is necessary to measure the position and orientation of an object moving on a belt conveyor, or to measure them while moving a measurement apparatus as placed on a robot arm.

A simple equipment configuration including, for example, a camera and projector needs to acquire, at different timings, an image sensed while an object is not irradiated in a special pattern, and that sensed while the object is irradiated in a distance measurement pattern. If the measurement object and the measurement apparatus stand relatively still, no problem occurs even if these two types of images are acquired at different timings.

However, if these two types of images are acquired at different timings while the measurement object or the measurement apparatus itself moves, the relative position relationship between the measurement object and the measurement apparatus varies between the time when the two-dimensional image is acquired and that when the range image is acquired. Therefore, in such a case, it is impossible to measure the position and orientation of an object with high accuracy.

SUMMARY OF THE INVENTION

The present invention provides a technique for measuring the position and orientation of a measurement object with high accuracy without complicating the configuration of a three-dimensional measurement apparatus even when the position and orientation relationship between the apparatus and the object changes at a high rate.

According to a first aspect of the present invention, there is provided a three-dimensional measurement apparatus comprising: a model holding unit configured to hold a three-dimensional shape model of a measurement object; a determination unit configured to determine a distance measurement region on the measurement object based on information indicating a three-dimensional shape of the measurement object; an illumination unit configured to irradiate the measurement object with a predetermined illumination pattern; an image sensing unit configured to sense an image of the measurement object while the illumination unit irradiates the measurement object; a distance calculation unit configured to calculate distance information indicating a distance from the image sensing unit to the measurement object based on region corresponding to the distance measurement region within the sensed image; and a position and orientation calculation unit configured to calculate a position and orientation of the measurement object based on the distance information and the three-dimensional shape model.

According to a second aspect of the present invention, there is provided a measurement method for a three-dimensional measurement apparatus which measures a position and orientation of a measurement object using a three-dimensional shape model of the measurement object, the method comprising: determining a distance measurement region on the measurement object based on information indicating a three-dimensional shape of the measurement object; irradiating the measurement object with a predetermined illumination pattern; sensing an image of the measurement object by an image sensing unit while the illumination unit irradiates the measurement object; calculating distance information indicating a distance from the image sensing unit to the measurement object based on region corresponding to the distance measurement region within the sensed image; and calculating the position and orientation of the measurement object based on the distance information and the three-dimensional shape model.

According to a third aspect of the present invention, there is provided a computer-readable storage medium storing a computer program for causing a computer to function as: a model holding unit configured to hold a three-dimensional shape model of a measurement object; a determination unit configured to determine a distance measurement region on the measurement object based on information indicating a three-dimensional shape of the measurement object; an illumination unit configured to irradiate the measurement object with a predetermined illumination pattern; an image sensing unit configured to sense an image of the measurement object while the illumination unit irradiates the measurement object; a distance calculation unit configured to calculate distance information indicating a distance from the image sensing unit to the measurement object based on region corresponding to the distance measurement region within the sensed image; and a position and orientation calculation unit configured to calculate a position and orientation of the measurement object based on the distance information and the three-dimensional shape model.

Further features of the present invention will become apparent from the following description of exemplary embodiments with reference to the attached drawings.

BRIEF DESCRIPTION OF THE DRAWINGS

FIGS. 2A to 2D are views for explaining one example of a method of defining a three-dimensional shape model;

FIGS. 4A to 4C are views for explaining an outline of a process for determining a distance measurement illumination region;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
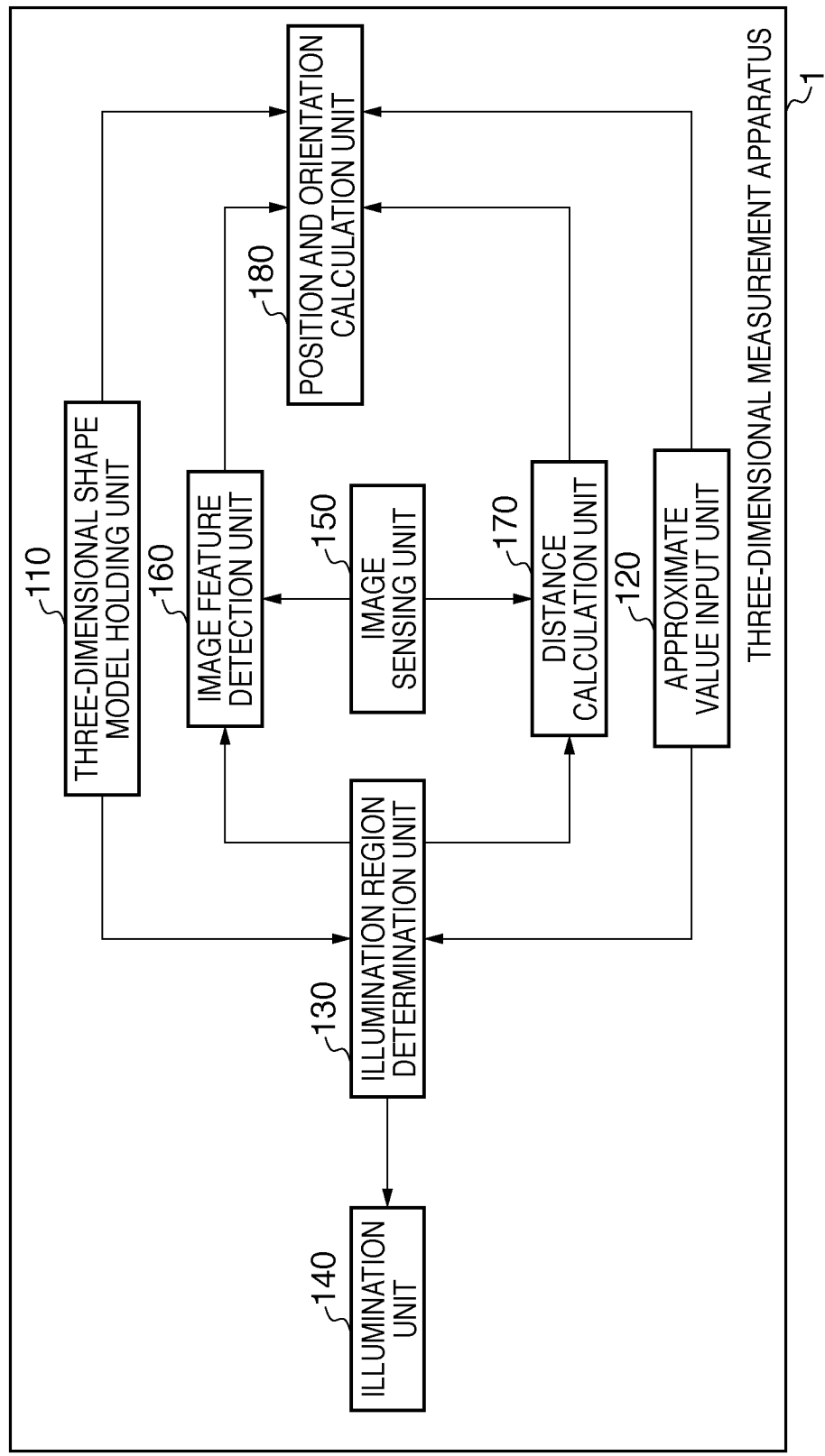
FIG. 1 is a block diagram illustrating one example of the configuration of a three-dimensional measurement apparatus 1 according to the first embodiment.

FIG. 1 is a block diagram illustrating one example of the configuration of a three-dimensional measurement apparatus 1 according to one embodiment of the present invention.

The three-dimensional measurement apparatus 1 includes a three-dimensional shape model holding unit 110, approximate value input unit 120, illumination region determination unit 130, illumination unit 140, image sensing unit 150, image feature detection unit 160, distance calculation unit 170, and position and orientation calculation unit 180.

The three-dimensional shape model holding unit 110 holds three-dimensional shape model data (to be referred to as a "three-dimensional shape model" hereinafter) of an object (to be referred to as a "measurement object" or to be sometimes simply referred to as an "object" hereinafter) whose three-dimensional information (the position and orientation of the object in this embodiment) is to be measured.

Figure 2A:
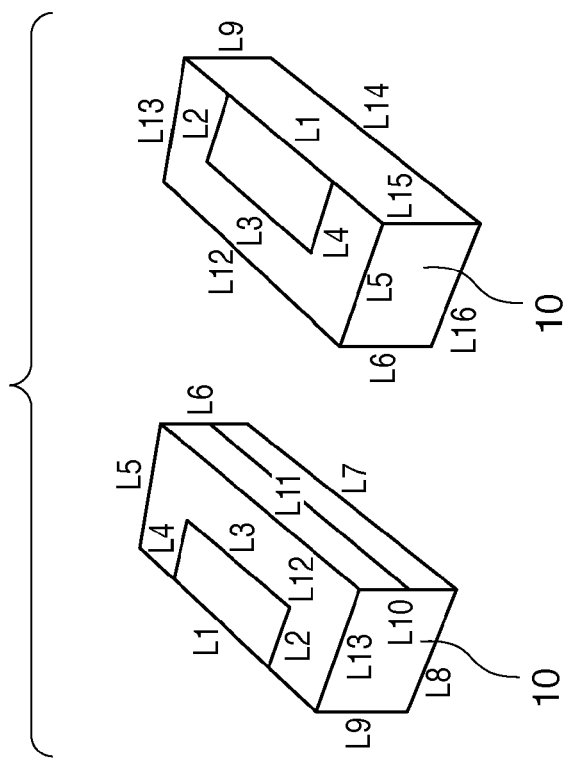
Figure 2B:
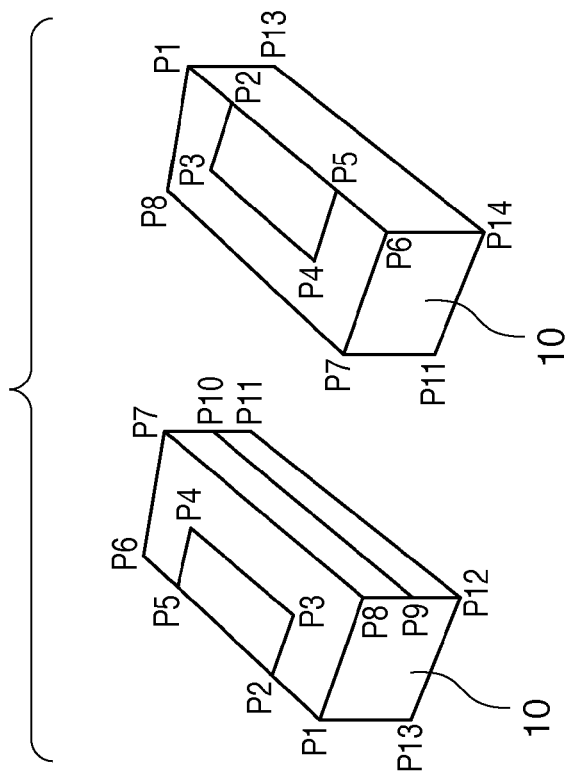

One example of a method of defining a three-dimensional shape model according to this embodiment will be described herein with reference to FIGS. 2A to 2D. A three-dimensional shape model is defined by information regarding planes formed from sets of points or by connecting respective points, and information regarding line segments which form planes. A three-dimensional shape model according to this embodiment is formed from 14 points: points P1 to P14 which represent a measurement object 10, as shown in FIG. 2A. The points P1 to P14 are indicated by three-dimensional coordinate values, as shown in FIG. 2C. Also, the three-dimensional shape model according to this embodiment is formed from line segments L1 to L16, as shown in FIG. 2B. The line segments L1 to L16 are indicated by the IDs (identifiers) of the points which form the line segments, as shown in FIG. 2D. The three-dimensional shape model also holds information regarding planes although they are not shown in FIGS. 2A to 2D. Each plane is indicated by the IDs of the points which form the plane. The three-dimensional shape model is used in a process for determining an illumination region and that for measuring the position and orientation of an object (measurement object 10).

The approximate value input unit 120 inputs approximate information (to be referred to as "approximate values" hereinafter) of the position and orientation of the object with respect to the three-dimensional measurement apparatus 1. Although the position and orientation of the object with respect to the three-dimensional measurement apparatus 1 mean those of the object with reference to the image sensing unit 150 in this embodiment, the image sensing unit 150 need not always be used as a reference. When, for example, the position and orientation of the object relative to the coordinate system defined on the image sensing unit 150 are known, and the position and orientation stay constant, another portion in the three-dimensional measurement apparatus 1 may be used as a reference. Also, in this embodiment, the values measured in the past (e.g., the last time) for an object by the three-dimensional measurement apparatus 1 are used as the approximate values of the position and orientation of the object. However, such values need not always be used as the approximate values of the position and orientation of the object. For example, a time-series filtering process (e.g., linear filtering or Kalman filtering) is performed for the values of the position and orientation of the object, which have been measured in the past, and the movement velocity and angular velocity of the object are estimated. The values of the position and orientation of the object may be predicted based on the obtained estimation result, and may then be used as the approximate values. The position and orientation of the object obtained by a sensor may also be used as the approximate values. The sensor mentioned herein may be of an arbitrary type (e.g., the magnetic type, the optical type, or the ultrasonic type) as long as it can measure the position and orientation of the object with six degrees of freedom. When the position and orientation of the object are roughly known in advance, the known values may be used as the approximate values. The approximate values of the position and orientation of the object are used in a process for determining an illumination region and a process for measuring the position and orientation of an object.

The illumination region determination unit 130 determines an illumination region (to be sometimes referred to as a "distance measurement region" hereinafter) where the object is (locally) irradiated with light in order to measure the distance from the object. More specifically, the three-dimensional shape model of the measurement object held in the three-dimensional shape model holding unit 110 is projected using the approximate values of the position and orientation of the measurement object input by the approximate value input unit 120. An illumination region (unit: pixel in this embodiment) is determined based on the projected image. Distance measurement illumination is performed for a region, where a change in density is so small that an image feature (e.g., an edge) is hard to detect in it, within the image sensed by the image sensing unit 150.

The illumination unit 140 irradiates the illumination region (distance measurement region) determined by the illumination region determination unit 130 with a predetermined illumination pattern (structured light). The illumination unit 140 performs the illumination using an illumination device. The illumination device need only be capable of local illumination and have a variable illumination pattern, and is, for example, a liquid crystal projector. A liquid crystal projector can control the display colors of the illumination pattern for each pixel. The internal parameters (e.g., the focal length, principal point position, and lens distortion) of the liquid crystal projector are desirably calibrated in advance. The illumination device is not limited to a liquid crystal projector, and may be, for example, a DMD (Digital Mirror Device) or a projector using LCOS.

The image sensing unit 150 simultaneously senses an image of the measurement object for use in image feature detection and that for use in distance measurement as a single image. In this case, even when the position and orientation relationship between the measurement object and the three-dimensional measurement apparatus 1 changes at a high rate, three-dimensional information of the object can be measured with high accuracy. The image sensing unit 150 performs the image sensing while the illumination unit 140 locally illuminates the distance measurement region. The internal parameters (e.g., the focal length, principal point position, and lens distortion) of the image sensing unit 150 are desirably calibrated in advance, like those of, for example, the above-mentioned liquid crystal projector. The values indicating the relative position and orientation between the image sensing unit 150 and the illumination unit 140 are desirably calibrated in advance as well. This makes it possible to perform triangulation using the structured light on the image sensed by the image sensing unit 150.

The image feature detection unit 160 detects an image feature representing the measurement object from the image sensed by the image sensing unit 150. The image feature detection unit 160 performs the image feature detection from the distance measurement region within the image. Note that an edge is detected as the image feature in this embodiment.

The distance calculation unit 170 calculates (measures) the distance (distance information) from the viewpoint position of the image sensing unit 150 to the measurement object. The distance calculation unit 170 performs the distance calculation based on a predetermined region (distance measurement region) within the image sensed by the image sensing unit 150. The distance from the viewpoint position of the image sensing unit 150 to the measurement object is calculated by, for example, performing triangulation for a pixel positioned within the distance measurement region. Note that the calculation process in the triangulation is performed based on, for example, the internal parameters of the image sensing unit 150 and illumination unit 140, and the values indicating the relative position and orientation between the image sensing unit 150 and the illumination unit 140.

The position and orientation calculation unit 180 performs a position and orientation calculation process to calculate (measure) three-dimensional information concerning the measurement object (i.e., the position and orientation of the measurement object). The position and orientation calculation unit 180 performs the three-dimensional information measurement based on, for example, the image feature detected by the image feature detection unit 160, and the distance information measured by the distance calculation unit 170.

One example of the configuration of the three-dimensional measurement apparatus 1 has been described above. Note that the three-dimensional measurement apparatus 1 includes a built-in computer. The computer includes a main control means such as a CPU and storage means such as a ROM (Read Only Memory), RAM (Random Access Memory), and HDD (Hard Disk Drive). In addition to them, the computer may include input/output means such as buttons and a display or a touch panel, and a communication means such as a network card. Note also that these constituent means are connected via a bus, and controlled by executing a program stored in the storage means by the control means.

Figure 3:
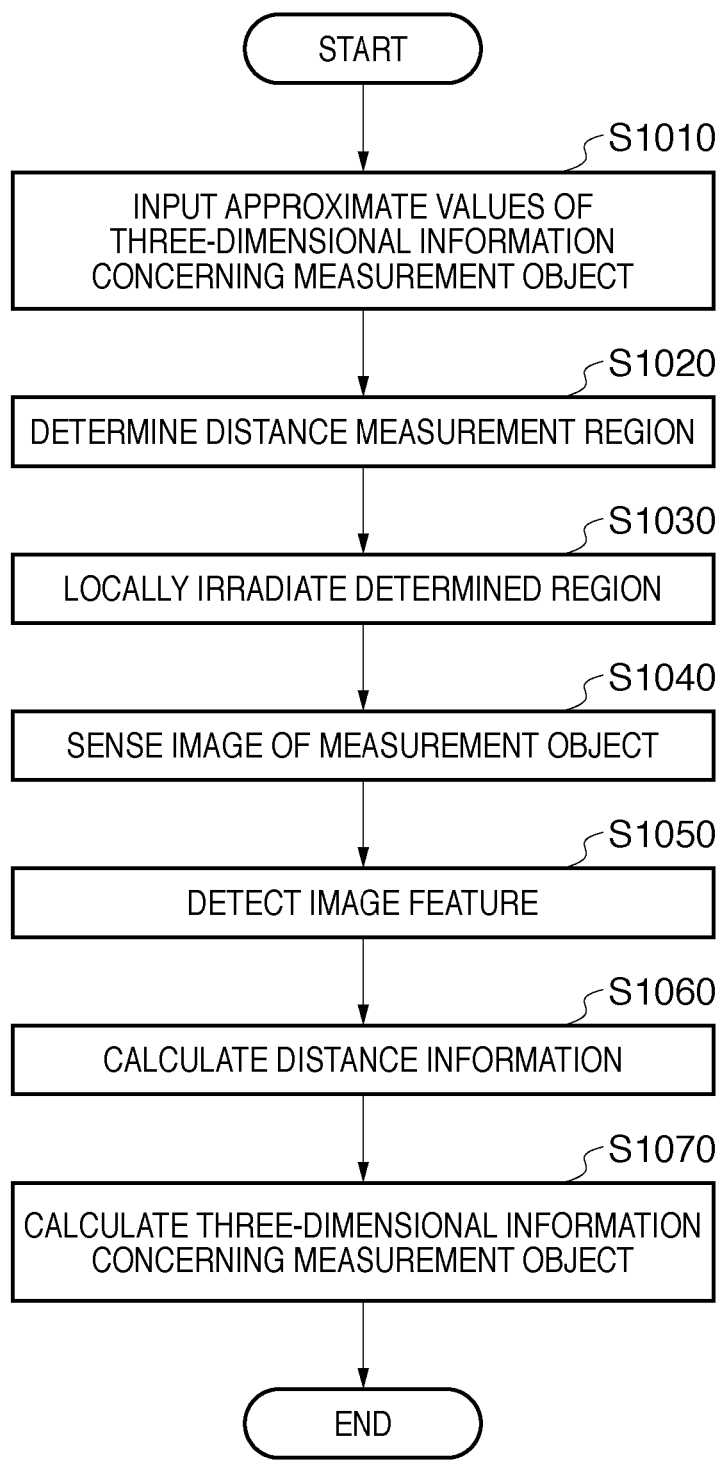
FIG. 3 is a flowchart illustrating one example of the sequence of the process of the three-dimensional measurement apparatus 1 according to the first embodiment.

One example of the sequence of a process for measuring the position and orientation of a measurement object by the three-dimensional measurement apparatus 1 shown in FIG. 1 will be described herein with reference to FIG. 3.

(S1010)

The three-dimensional measurement apparatus 1 uses the approximate value input unit 120 to input approximate three-dimensional information concerning a measurement object (i.e., the approximate values of the position and orientation of an object with respect to the three-dimensional measurement apparatus 1). In this embodiment, the values measured in the past (e.g., the last time) for an object by the three-dimensional measurement apparatus 1 are used as the approximate values of the position and orientation of the object, as described earlier.

(S1020)

The three-dimensional measurement apparatus 1 uses the illumination region determination unit 130 to determine an illumination region (distance measurement region). An illumination region is determined based on a three-dimensional shape model of the measurement object, and the approximate values of the position and orientation of the measurement object, as described earlier. Also, distance measurement illumination is performed for a region where a change in density is so small that an image feature (e.g., an edge) is hard to detect in it, as described earlier.

A process for determining a distance measurement region by the illumination region determination unit 130 will be described herein. To determine a distance measurement region, the planes of the measurement object are rendered (projected) on an image, and the rendered image is separated into the background part and the object part. This rendering is performed based on, for example, the internal parameters of the image sensing unit 150, and the approximate values of the position and orientation of the measurement object.

First, the illumination region determination unit 130 generates a mask image with the same size as an image to be sensed by the image sensing unit 150, and initializes all pixel values within the mask image to 0. Next, the illumination region determination unit 130 renders an image of a three-dimensional shape model (three-dimensional shape model image) of a measurement object based on the approximate values of the position and orientation of the object using graphics hardware. At this time, the background within the three-dimensional shape model image is rendered in black, and the planes of the object within it are rendered in white (FIG. 4A). The values, within the mask image, of the white pixels within the rendered image are changed to 1. Also, the illumination region determination unit 130 renders the line segments of the object within the three-dimensional shape model image in black using graphics hardware (FIG. 4B). The illumination region determination unit 130 changes the values of the pixels, which have been rendered in black within the three-dimensional shape model image and yet have values of 1 at their corresponding positions within the mask image, to 0.

Lastly, the illumination region determination unit 130 changes the values, within the mask image, of predetermined pixels having values of 1 within the mask image to 0. More specifically, the values, within the mask image, of pixels which are located in the vicinity of those having values of 0 within the mask image (pixels which fall within a predetermined range) and which have values of 1 within the mask image are changed from 1 to 0 (FIG. 4C).

At this time, the illumination region determination unit 130 determines the pixels having values of 1 within the mask image, obtained by the above-mentioned process, as illumination regions (i.e., distance measurement regions). Note that the relative position and orientation between the image sensing unit 150 and the illumination unit 140 have offsets. For this reason, it is necessary to transform the position of each pixel within the image sensed by the image sensing unit 150 into that of each pixel in the illumination pattern of the illumination unit 140 using their geometrical relationship. More specifically, the illumination region determination unit 130 renders the measurement object on a z-buffer using graphics hardware. The three-dimensional coordinate values of the pixels having values of 1 within the mask image (with reference to the image sensing unit 150) are calculated using the coordinates of the pixels and the values of the z-buffer. After that, the illumination region determination unit 130 transforms the obtained three-dimensional coordinate values into coordinates (coordinates indicating the distance measurement region) in the illumination pattern based on the values indicating the relative position and orientation between the image sensing unit 150 and the illumination unit 140, and the internal parameters of the illumination unit 140.

Although a case in which a projected image (the line segments and planes) of a three-dimensional shape model is rendered using graphics hardware has been explained herein, the present invention is not limited to this, and the CPU, for example, may perform the rendering.

(S1030)

Figure 5:
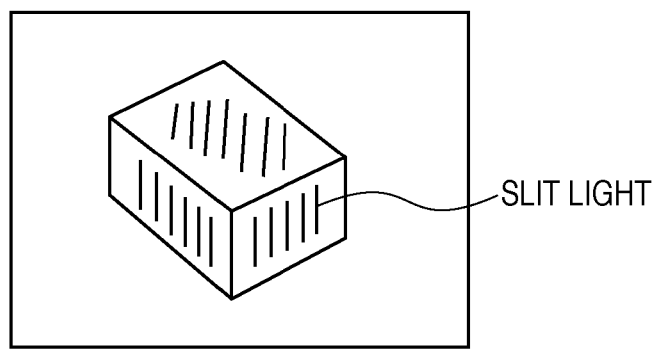
FIG. 5 is a view illustrating one example of an outline of a method of illuminating a measurement object.

The three-dimensional measurement apparatus 1 uses the illumination unit 140 to locally irradiate the distance measurement region determined by the mask process in step S1020 with a predetermined illumination pattern (structured light). This illumination is performed by controlling an illumination device such as a liquid crystal projector, as described earlier. In this process, the distance measurement region (for each pixel) is irradiated with structured light (multi-slit light in this case), as shown in FIG. 5. That is, not the entire field but only the region (distance measurement region) determined by the mask process in step S1020 is irradiated.

Although a case in which multi-slit light is used as the structured light will be taken as an example in this embodiment, the structured light is not limited to this, and another means may be used if a plurality of times of image sensing are unnecessary. A region which is not irradiated with distance measurement light (i.e., an image feature detection region) need only obtain sufficient brightness by means of ambient light, and need not be irradiated with special light. If sufficient brightness cannot be obtained by means of ambient light, the illumination pattern need only be changed so as to irradiate that region with, for example, uniform white light.

(S1040)

The three-dimensional measurement apparatus 1 uses the image sensing unit 150 to sense an image of the measurement object. In this image sensing, an image for use in image feature detection and that for use in distance measurement are simultaneously sensed as a single image, as described earlier. Note that this image sensing is performed while the distance measurement region is locally illuminated.

(S1050)

Figure 6B:
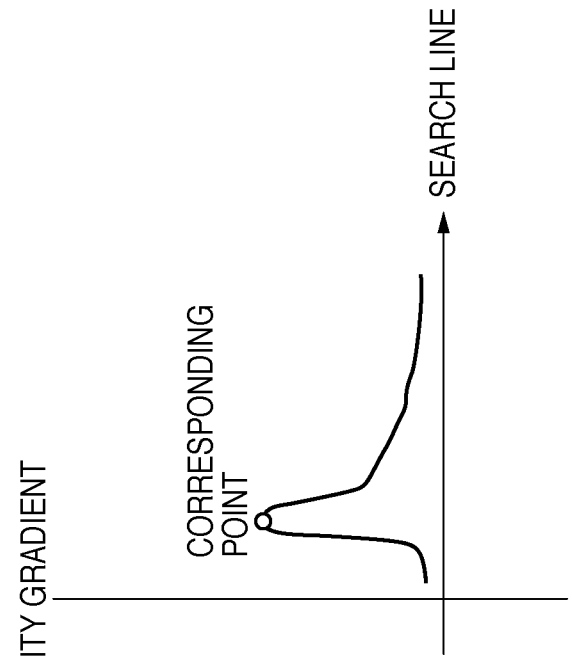
FIGS. 6A and 6B are views for explaining one example of an outline of an edge detection method.
Figure 6A:
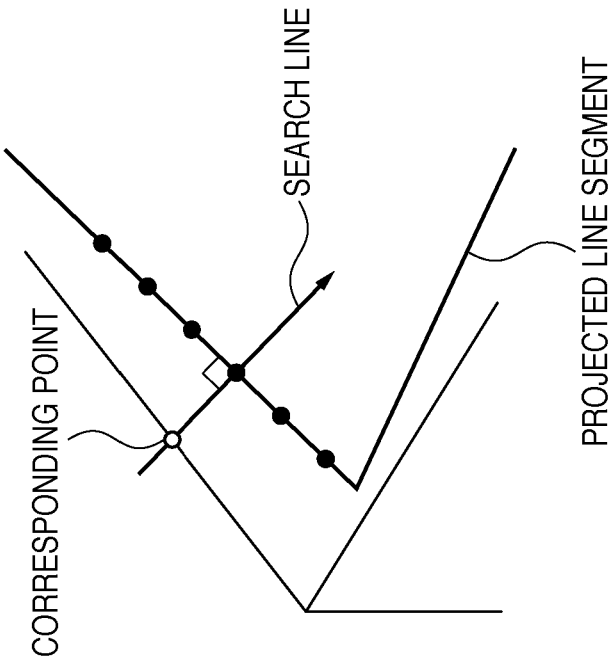

The three-dimensional measurement apparatus 1 uses the image feature detection unit 160 to detect an image feature from the image sensed by the image sensing unit 150. In this embodiment, an edge is detected as the image feature, as described earlier. The edge detection is performed using, for example, the technique disclosed in Reference 1. One example of an outline of an edge detection method according to this embodiment will be described herein with reference to FIGS. 6A and 6B. In the edge detection, first, an image (line segments) projected onto the sensed image of the measurement object is obtained. The projected image is obtained based on the approximate values of the position and orientation of the measurement object input in step S1010. Next, control points are equidistantly set on each projected line segment. An edge is one-dimensionally searched for from a line segment (to be referred to as a "search line" hereinafter) that is parallel to the direction of a normal to the projected line segment and passes through the control point (FIG. 6A). The edge is an extremum of the density gradient of a pixel value (FIG. 6B). In some cases, a plurality of edges are detected from a search line. In this case, a technique disclosed in "L. Vacchetti, V. Lepetit, and P. Fua, "Combining edge and texture information for real-time accurate 3D camera tracking," Proc. ISMAR04, pp. 48-57, 2004" is used in this embodiment. That is, the plurality of edges detected using the method disclosed in this reference are held as tentative edges. In this way, an edge corresponding to each control point is searched for, and a three-dimensional line segment is fitted to the edge in the process of step S1070 (to be described later). Note that if coordinates obtained by quantizing an image of each control point for each pixel correspond to those of the distance measurement region (pixel), the corresponding pixel does not undergo edge detection.

(S1060)

The three-dimensional measurement apparatus 1 uses the distance calculation unit 170 to calculate (measure) the distance based on the image sensed by the image sensing unit 150. More specifically, the distance is calculated based on the distance measurement region (pixel). The distance is calculated by triangulation, as described earlier. The region (the position of a pixel within the image) irradiated by the illumination unit 140, and the position corresponding to that region on the image sensed by the image sensing unit 150 are used in the distance calculation. In addition to them, the internal parameters of the illumination unit 140 and image sensing unit 150, and the values indicating the relative position and orientation between the image sensing unit 150 and the illumination unit 140 are used.

After the distance measurement, the distance calculation unit 170 transforms the measurement object within the sensed image into point cloud data with three-dimensional coordinate values in the coordinate system defined on the image sensing unit 150. The three-dimensional coordinate values are calculated by multiplying the sight line vector corresponding to the position of each point on the measurement object within the sensed image by the distance information.

(S1070)

The three-dimensional measurement apparatus 1 uses the position and orientation calculation unit 180 to calculate (measure) three-dimensional information concerning the measurement object (the position and orientation of the measurement object with respect to the three-dimensional measurement apparatus 1).

Figure 7:
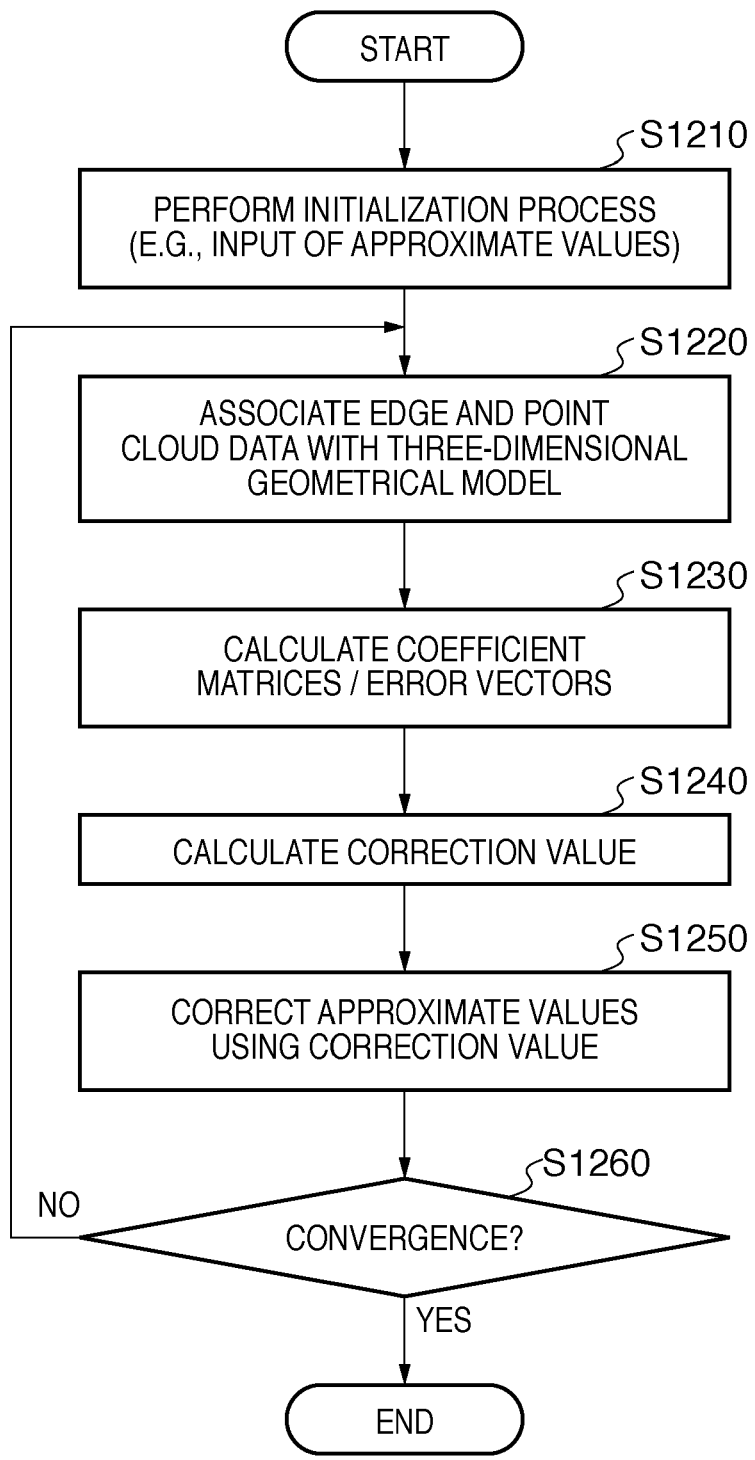
FIG. 7 is a flowchart illustrating one example of the sequence of a position and orientation calculation process.

A position and orientation calculation process in step S1070 of FIG. 3 will be described in detail next with reference to FIG. 7. In this process, an iterative operation is performed using the Gauss-Newton method to correct the approximate values of the position and orientation (to be denoted by reference symbol "s" hereinafter) of the measurement object. In this way, the position and orientation of the measurement object are calculated. Note that the position and orientation calculation process is not limited to the Gauss-Newton method. The Levenberg-Marquardt method which allows more robust calculation, or the steepest descent method which allows simpler calculation, for example, may be adopted. Another nonlinear optimized calculation method such as the conjugate gradient method or the ICCG method may also be adopted.

The sum total (the sum of squares) of the distance, on the image (on the two-dimensional plane), between the detected edge and the line segment of the projected three-dimensional shape model, and that, in the coordinate system (in the three-dimensional space) defined on the image sensing unit 150, between the point which forms the point cloud data and the plane of the projected three-dimensional shape model is minimized. In this way, the position and orientation with respect to the measurement object are optimized. More specifically, the signed distance between each point and its corresponding straight line on the two-dimensional image, and that between each point and its corresponding plane in the three-dimensional space are expressed as linear functions describing a minute change in position and orientation of the object using first-order Taylor expansions. A linear simultaneous equation associated with a minute change in position and orientation of the object, in which the signed distances are zero, is established and solved. In this way, a minute change in position and orientation of the object is obtained, and a process of correcting the obtained value is repeated.

(S1210)

The three-dimensional measurement apparatus 1 uses the position and orientation calculation unit 180 to perform an initialization process first. In this initialization process, the approximate values of the position and orientation of the measurement object obtained in step S1010 of FIG. 3, for example, are input.

(S1220)

The three-dimensional measurement apparatus 1 uses the position and orientation calculation unit 180 to associate the edge and the point cloud data with the three-dimensional shape model. In this process, first, each line segment of the three-dimensional shape model is projected onto an image based on the approximate values of the position and orientation of the measurement object obtained in step S1210, and the coordinates of each plane of the projected three-dimensional shape model are transformed into those in the coordinate system defined on the image sensing unit 150. The edge and the point cloud data are associated with the three-dimensional shape model. If a plurality of edges are detected in correspondence with each control point, an edge nearest to the projected line segment on the image among the plurality of detected edges is associated with the control point. This association is performed based on the approximate values of the position and orientation of the measurement object obtained in step S1210. Also, a plane nearest to the point cloud data in the three-dimensional shape model is searched for and associated with the point cloud data based on the three-dimensional coordinates of each point in the coordinate system defined on the image sensing unit 150.

(S1230)

The three-dimensional measurement apparatus 1 uses the position and orientation calculation unit 180 to calculate coefficient matrices and error vectors to solve the linear simultaneous equation. Each element of the coefficient matrix is a first-order partial differential coefficient for the minute change in approximate value obtained in step S1210. The partial differential coefficients of the image coordinates are calculated for the edge, and those of the three-dimensional coordinates are calculated for the point cloud data. Also, the error vector of the edge represents the distance, on the two-dimensional plane (image), between the projected line segment and the detected edge, and the error vector of the point cloud data represents the distance, in the three-dimensional space, between the point which forms the point cloud data and the plane of the three-dimensional shape model.

Figure 8:
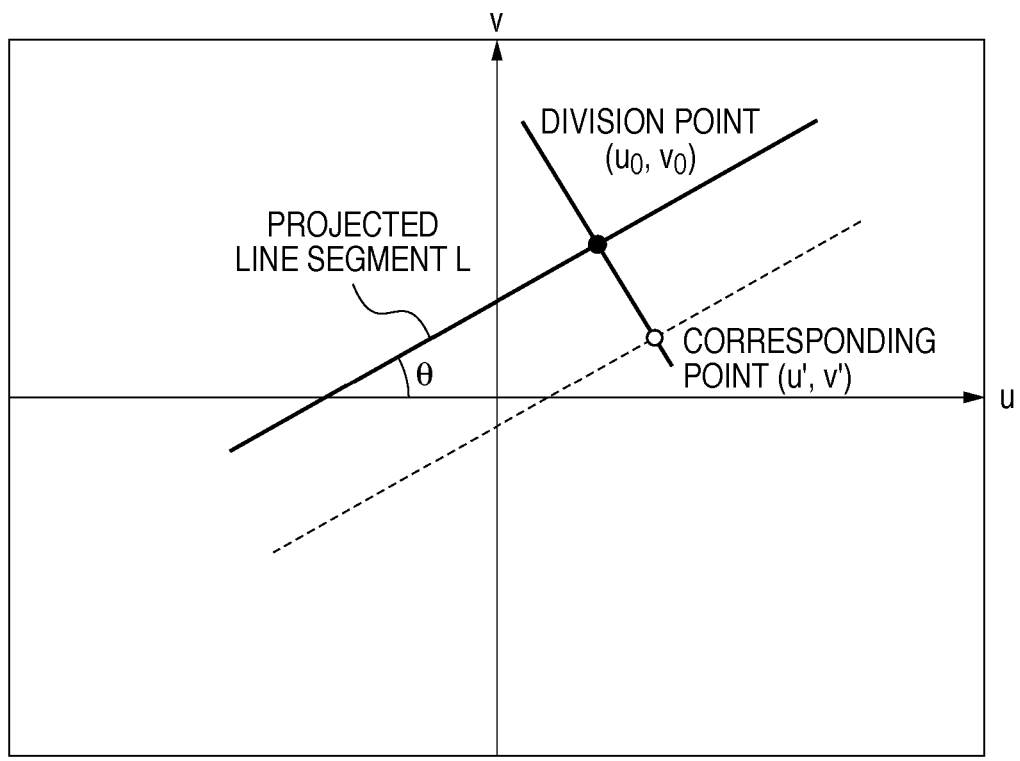
FIG. 8 is a graph illustrating one example of the relationship between the projected image of a line segment and the detected edge.

FIG. 8 is a graph illustrating one example of the relationship between the projected image of a line segment and the detected edge. In this case, the u-axis indicates the horizontal direction on the image, and the v-axis indicates its vertical direction. Letting ($u_0$, $v_0$) be the position of a certain control point (a point obtained by equidistantly dividing each projected line segment on the image) on the image, and θ be the slope angle (the slope angle with respect to the u-axis) of a line segment L to which the control point belongs on the image. The slope angle θ is calculated as the slope angle of a straight line which connects the coordinates of the two ends of the line segment L on an image onto which the three-dimensional coordinates of these two ends are projected based on the position and orientation s. Then, the normal vector to the line segment L on the image is (sin θ, −cos θ). Also, let (u', v') be the coordinates of the point corresponding to the control point. Then, a point (u, v) on a straight line, which passes through the point (u', v') and has the slope angle θ, is given by:

$$u \sin\theta - v \cos\theta = d \quad (1)$$

(θ is a constant)
where $$d = u' \sin\theta - v' \cos\theta$$

(constant)

The position of the control point on the image changes depending on the position and orientation of the measurement object. The position and orientation of the measurement object have six degrees of freedom. That is, the position and orientation s is a six-dimensional vector, and includes three elements describing the position of the measurement object and three elements describing its orientation. The three elements describing the orientation are represented by, for example, an Euler angle or a three-dimensional vector having a direction indicating a rotation axis and a magnitude indicating a rotation angle. The coordinates (u, v) of the control point can be approximated using first-order Taylor expansions near the position ($u_0$, $v_0$) as:

$$u \approx u_0 + \sum_{i=1}^{6} \frac{\partial u}{\partial s_i}\Delta s_i \quad (2)$$

$$v \approx v_0 + \sum_{i=1}^{6} \frac{\partial v}{\partial s_i}\Delta s_i$$

where $\Delta s_i$ (i=1, 2, ..., 6) describes a minute change in each component of the position and orientation s.

The position of the control point on the image obtained by a correct position and orientation can be assumed to be present on a straight line described by relation (1). Substituting the coordinates u and v approximated by relations (2) into relation (1) yields:

$$\sin\theta \sum_{i=1}^{6} \frac{\partial u}{\partial s_i}\Delta s_i - \cos\theta \sum_{i=1}^{6} \frac{\partial v}{\partial s_i}\Delta s_i = d - r \quad (3)$$

where $$r = u_0 \sin\theta - v_0 \cos\theta$$

(constant)

The three-dimensional coordinates in the coordinate system defined on the image sensing unit 150 can be transformed into three-dimensional coordinates (x, y, z) in the coordinate system defined on the measurement object using the position and orientation s of the measurement object. Assume that a certain point is transformed into a point ($x_0$, $y_0$, $z_0$) in the coordinate system defined on the measurement object using the approximate values obtained in step S1210. Because the coordinates (x, y, z) change depending on the position and orientation of the measurement object, they can be approximated by first-order Taylor expansions near the point ($x_0$, $y_0$, $z_0$) as:

$$x \approx x_0 + \sum_{i=1}^{6} \frac{\partial x}{\partial s_i}\Delta s_i \quad (4)$$

$$y \approx y_0 + \sum_{i=1}^{6} \frac{\partial y}{\partial s_i}\Delta s_i$$

$$z \approx z_0 + \sum_{i=1}^{6} \frac{\partial z}{\partial s_i}\Delta s_i$$

In step S1220, an equation, describing the plane of the three-dimensional shape model associated with a certain point in the point cloud data, in the coordinate system defined on the measurement object is defined as "ax+by+cz=e (where $a^2+b^2+c^2=1$, and a, b, c, and e are constants). Assume that the coordinates (x, y, z) transformed using the correct position and orientation s satisfy the plane equation "ax+by+cz=e ($a^2+b^2+c^2=1$). Substituting relations (4) into the plane equation yields:

$$a\sum_{i=1}^{6} \frac{\partial x}{\partial s_i}\Delta s_i + b\sum_{i=1}^{6} \frac{\partial y}{\partial s_i}\Delta s_i + c\sum_{i=1}^{6} \frac{\partial z}{\partial s_i}\Delta s_i = e - q \quad (5)$$

where $$q = ax_0 + by_0 + cz_0$$

(constant)

Relation (3) holds true for all edges associated with the three-dimensional shape model in step S1220. Also, relation (5) holds true for all point cloud data associated with the three-dimensional shape model in step S1220. Thus, we have a linear simultaneous equation associated with $\Delta s_i$:

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_1 \frac{\partial v_2}{\partial s_1} & \sin\theta_2 \frac{\partial u_2}{\partial s_2} - \cos\theta_1 \frac{\partial v_2}{\partial s_2} & \cdots & \sin\theta_1 \frac{\partial u_2}{\partial s_6} - \cos\theta_1 \frac{\partial v_2}{\partial s_6} \\ \vdots & \vdots & \ddots & \vdots \\ a_1 \frac{\partial x_1}{\partial s_1} + b_1 \frac{\partial y_1}{\partial s_1} + c_1 \frac{\partial z_1}{\partial s_1} & a_1 \frac{\partial x_1}{\partial s_2} + b_1 \frac{\partial y_1}{\partial s_2} + c_1 \frac{\partial z_1}{\partial s_2} & \cdots & a_1 \frac{\partial x_1}{\partial s_6} + b_1 \frac{\partial y_1}{\partial s_6} + c_1 \frac{\partial z_1}{\partial s_6} \\ a_2 \frac{\partial x_2}{\partial s_1} + b_2 \frac{\partial y_2}{\partial s_1} + c_2 \frac{\partial z_2}{\partial s_1} & a_2 \frac{\partial x_2}{\partial s_2} + b_2 \frac{\partial y_2}{\partial s_2} + c_2 \frac{\partial z_2}{\partial s_2} & \cdots & a_2 \frac{\partial x_2}{\partial s_6} + b_2 \frac{\partial y_2}{\partial s_6} + c_2 \frac{\partial z_2}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e_1 - q_1 \\ e_2 - q_2 \\ \vdots \end{bmatrix} \quad (6)$$

Relation (6) is rewritten as:

$$J\Delta s = E \quad (7)$$

The partial differential coefficients to calculate the coefficient matrix J of the linear simultaneous equation expressed by relation (6) are calculated using, for example, the technique disclosed in Reference 1.

(S1240)

The correction value $\Delta s$ is obtained using a generalized inverse matrix $(J^T \cdot J)^{-1} \cdot J^T$ to the matrix J based on relation (7). Note that the edge and the point cloud data often have outliers due to, for example, erroneous detection, so a robust estimation method, as will be described hereinafter, is adopted. In general, an edge (or point cloud data) having an outlier has a large error d-r (e-q). Thus, this edge contributes to the simultaneous equation expressed by relations (6) and (7) to a large degree, resulting in deterioration in precision of the obtained correction value $\Delta s$. To cope with this, a small weight is assigned to data with a large error d-r (e-q), and a large weight is assigned to data with a small error d-r (e-q). These weights are assigned using, for example, Tukey functions:

$$w(d-r) = \begin{cases} (1 - ((d-r)/c_1)^2)^2 & |d-r| \le c_1 \\ 0 & |d-r| > c_1 \end{cases} \quad (8)$$

$$w(e-q) = \begin{cases} (1 - ((e-q)/c_2)^2)^2 & |e-q| \le c_2 \\ 0 & |e-q| > c_2 \end{cases}$$

where $c_1$ and $c_2$ are constants. The weighting functions need not always be Tukey functions, and may be arbitrary functions as long as they assign a small weight to data with a large error and assign a large weight to data with a small error. For this reason, Huber functions, for example, may be adopted.

Let $w_i$ be the weight corresponding to each data (edge or point cloud data). Then, a weight matrix W is defined as:

$$W = \begin{bmatrix} w_1 & & & 0 \\ & w_2 & & \\ & & \ddots & \\ 0 & & & w_{N_c} \end{bmatrix} \quad (9)$$

The weight matrix W is a square matrix in which elements other than diagonal elements are all zero, and the weights $w_i$ are assigned to the diagonal elements. Using the weight matrix W, relation (7) is rewritten as:

$$WJ\Delta s = WE \quad (10)$$

Solving relation (10) yields a correction value $\Delta s$:

$$\Delta s = (J^T W J)^{-1} J^T W E \quad (11)$$

(S1250)

The three-dimensional measurement apparatus 1 corrects the approximate values, obtained in step S1210, using the correction value $\Delta s$ calculated in step S1240. In this way, the position and orientation of the measurement object are calculated.

(S1260)

The three-dimensional measurement apparatus 1 determines whether the correction result converges. If the correction result converges, this process ends; otherwise, the process returns to step S1220. Note that it is determined that the correction result converges when the correction value $\Delta s$ is nearly zero or when the difference between the sums of squares of the error vectors before and after correction is nearly zero.

As has been described above, according to the first embodiment, a measurement object is locally irradiated and sensed in this state based on the approximate values of the position and orientation of the measurement object, and a three-dimensional shape model of the measurement object. An image feature and distance information are detected from the sensed image, and three-dimensional information concerning the measurement object is calculated based on the detection results. That is, the position and orientation of the measurement object are measured by complimentarily using an image (two-dimensional image) for use in image feature detection and that (three-dimensional image) for use in distance measurement.

This makes it possible to measure three-dimensional information concerning a measurement object with high accuracy free from the influence of the surface property and structure of the object. Also, this does not complicate the configuration of the three-dimensional measurement apparatus.

Moreover, an image for use in image feature detection and that for use in distance measurement are sensed as a single image. Hence, even when the position and orientation relationship between the three-dimensional measurement apparatus and a measurement object changes at a high rate, it is possible to measure three-dimensional information concerning the object with high accuracy. It is also possible to speed up the measurement process.

Although a case in which an image for use in image feature detection and that for use in distance measurement are simultaneously acquired as a single image has been explained in the above-described first embodiment, these images may be separately sensed. The above-mentioned process can be performed even by using images sensed at different timings if, for example, both the three-dimensional measurement and the measurement object stand still.

Second Embodiment

The second embodiment will be described next. A case in which pieces of distance information are acquired from the respective parts of a measurement object using a plurality of image sensing devices, and the position and orientation of the measurement object are measured based on the pieces of distance information will be explained in the second embodiment.

Figure 9:
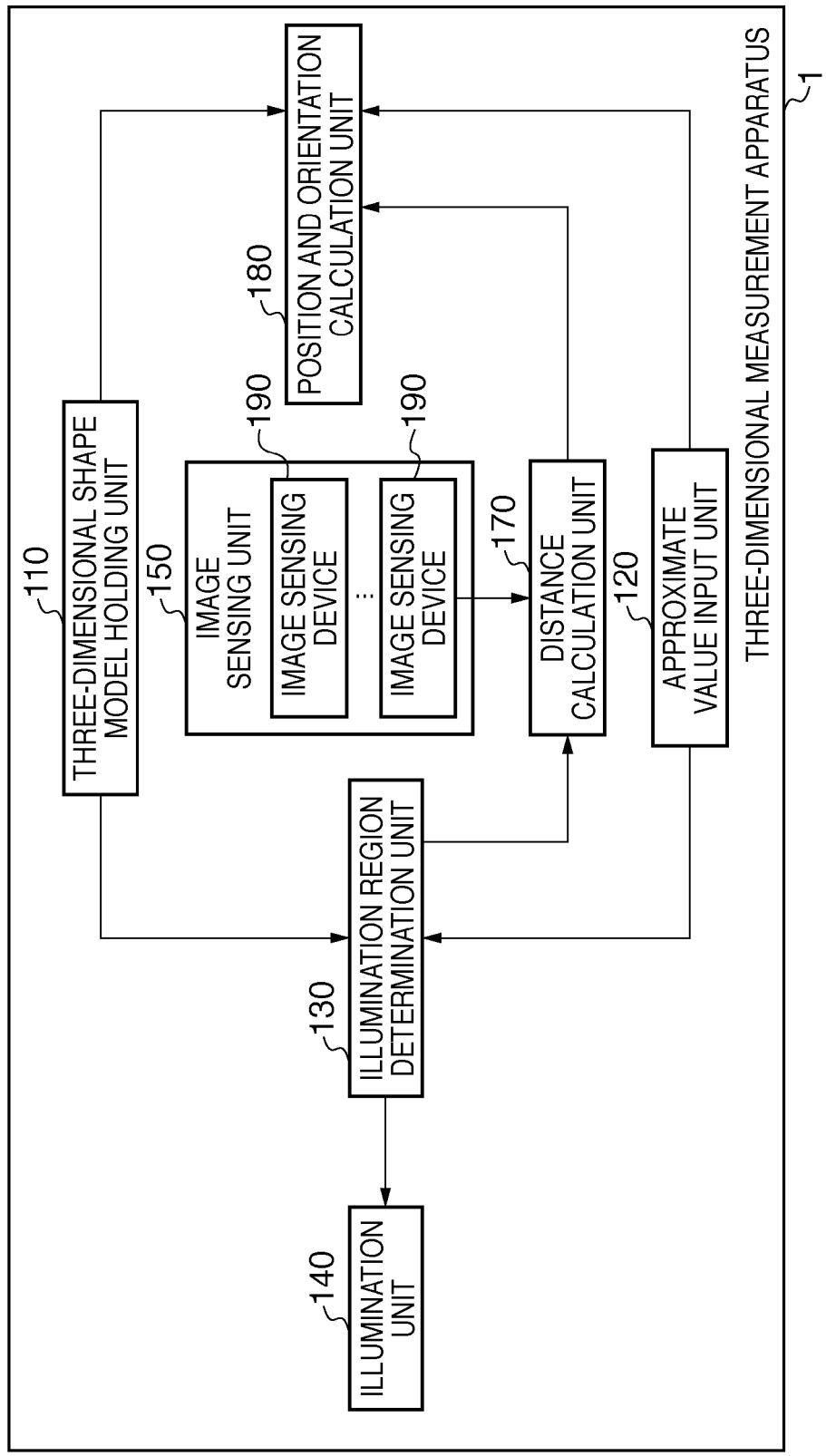
FIG. 9 is a block diagram illustrating one example of the configuration of a three-dimensional measurement apparatus 1 according to the second embodiment.

FIG. 9 is a block diagram illustrating one example of the configuration of a three-dimensional measurement apparatus 1 according to the second embodiment. Note that the same reference numerals as in FIG. 1 of the first embodiment denote constituent components having the same functions in the second embodiment. Attention will be focused on differences from the first embodiment.

The three-dimensional measurement apparatus 1 includes a three-dimensional shape model holding unit 110, approximate value input unit 120, illumination region determination unit 130, illumination unit 140, image sensing unit 150, distance calculation unit 170, and position and orientation calculation unit 180. That is, the image feature detection unit 160 is omitted from the configuration in the first embodiment.

The image sensing unit 150 includes a plurality of image sensing devices 190. The internal parameters (e.g., the focal lengths and principal point positions) of the image sensing devices 190 and their geometrical relationship are calibrated in advance. The internal parameters of the illumination unit 140 are also calibrated in advance. The geometrical relationship among the image sensing devices 190 can be calibrated by sensing a known pattern (e.g., a two-dimensional lattice pattern), calculating an essential matrix based on corresponding points on the sensed images, and decomposing the essential matrix into a position and orientation.

The distance calculation unit 170 calculates (measures) the distance (distance information) of a point on the measurement object based on the images sensed by the image sensing unit 150. The distance calculation may be performed for a large number of pixels within the image or for only feature points detected by a feature point detector such as a Harris detector. That is, an arbitrary point may be determined as a distance calculation target as long as the corresponding points on the images sensed by the plurality of image sensing devices can be associated with each other.

The position and orientation calculation unit 180 calculates (measures) the position and orientation of the measurement object without using the image feature detection result. That is, in the second embodiment, the position and orientation calculation unit 180 calculates the position and orientation of the measurement object based on the distance information calculated by the distance calculation unit 170. More specifically, the position and orientation calculation unit 180 calculates the position and orientation of the measurement object by fitting a three-dimensional shape model to the distance information calculated by the distance calculation unit 170.

Figure 10:
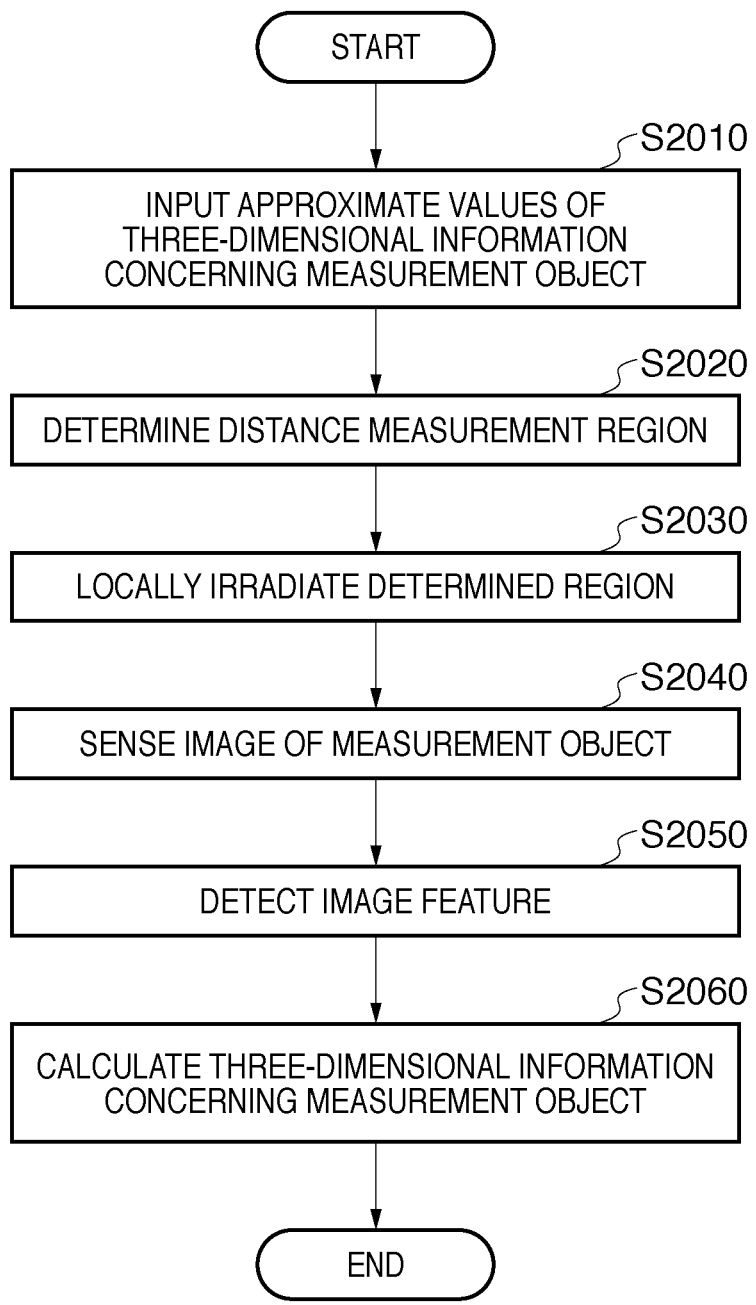
FIG. 10 is a flowchart illustrating one example of the sequence of the process of the three-dimensional measurement apparatus 1 according to the second embodiment.

One example of the sequence of a process for measuring the position and orientation of a measurement object by the three-dimensional measurement apparatus 1 according to the second embodiment will be described herein with reference to FIG. 10.

(S2010)

The three-dimensional measurement apparatus 1 uses the approximate value input unit 120 to input the approximate values of three-dimensional information concerning a measurement object (i.e., the approximate values of the position and orientation of an object with respect to the three-dimensional measurement apparatus 1). The process in step S2010 is the same as that in step S1010 of FIG. 3 referred to in the explanation of the first embodiment.

(S2020)

The three-dimensional measurement apparatus 1 uses the illumination region determination unit 130 to determine an illumination region (i.e., a distance measurement region). The process in step S2020 is the same as that in step S1020 of FIG. 3 referred to in the explanation of the first embodiment.

(S2030)

The three-dimensional measurement apparatus 1 uses the illumination unit 140 to irradiate the distance measurement region determined in step S2020 with a predetermined illumination pattern (structured light). Distance measurement illumination is performed for, for example, a region, where a change in density is so small that an image feature is hard to detect in it, within the image sensed by the image sensing unit 150. The process in step S2030 is the same as that in step S1030 of FIG. 3 referred to in the explanation of the first embodiment. As in the first embodiment, a region which is not irradiated with distance measurement light (i.e., an image feature detection region) need only obtain sufficient brightness by means of ambient light, and need not be irradiated with special light. If sufficient brightness cannot be obtained by means of ambient light, the illumination pattern need only be changed so as to irradiate that region with, for example, uniform white light.

(S2040)

The three-dimensional measurement apparatus 1 uses the plurality of image sensing devices 190 which constitute the image sensing unit 150 to sense images of the measurement object. Note that this image sensing is performed while the distance measurement region is locally illuminated.

(S2050)

The three-dimensional measurement apparatus 1 uses the distance calculation unit 170 to calculate (measure) the distance (distance information) based on the images sensed by the image sensing unit 150. In the second embodiment, the distance calculation is performed for all pixels within the images sensed by the image sensing devices 190 serving as references without detecting feature points from the sensed images. In the distance calculation, it is necessary to associate corresponding pixels among the images sensed by the image sensing devices 190 with each other. As for the distance measurement region, corresponding pixels among the images are associated with each other by tracking a projected image of structured light (e.g., multi-slit light) on a time-series basis. As for the region which is not irradiated with light, corresponding pixels among the images can be associated with each other by, for example, block matching of pixel values for points on epipolar lines determined by an epipolar constraint. The association of corresponding pixels among the images with each other is not limited to this. The association may be performed using, for example, a local descriptor as disclosed in "E. Tola, V. Lepetit, and P. Fua, "A fast local descriptor for dense matching," Proc. CVPR '08, 2008". A random dot pattern, for example, may also be adopted as the structured light, in place of multi-slit light. In this case, corresponding pixels among the images can be associated with each other without tracking on a time-series basis.

(S2060)

The three-dimensional measurement apparatus 1 uses the position and orientation calculation unit 180 to calculate (measure) three-dimensional information concerning the measurement object (the position and orientation of the measurement object with respect to the three-dimensional measurement apparatus 1). At this time, the position and orientation of the measurement object are calculated in order to transform the distance information calculated in step S2050 into point cloud data having three-dimensional coordinate values, and fit a three-dimensional shape model to the point cloud data. In this process, first, a plane, nearest to each point in the point cloud data, in the three-dimensional model is selected and associated with the point. The approximate values of the position and orientation of the measurement object are repeatedly corrected so that the sum total of the distance between each point and its corresponding plane is minimized. In this way, the position and orientation of the measurement object are calculated. The position and orientation calculation process in step S2060 is basically the same as that in step S1070 of FIG. 3 referred to in the explanation of the first embodiment. A difference lies in that no image feature process is performed in the second embodiment. Therefore, a detailed description of step S2060 will not be given herein.

As has been described above, according to the second embodiment, three-dimensional information concerning a measurement object is measured based on distance information obtained by the plurality of image sensing devices without an image feature detection process. More specifically, regions, where changes in density are small, within the plane of a measurement object are illuminated, and pieces of distance information are acquired from all over the respective parts of the measurement object. This makes it possible to measure three-dimensional information concerning a measurement object with high accuracy free from the influence of the surface property and structure of the object, as in the first embodiment. Also, this does not complicate the configuration of the three-dimensional measurement apparatus.

Third Embodiment

The third embodiment will be described next. A case in which a distance measurement region is locally illuminated (illumination control) has been explained in the above-described first and second embodiments. In contrast to this, a case in which a process equivalent to those in the above-described first and second embodiments is performed without illumination control will be explained in the third embodiment.

Figure 11:
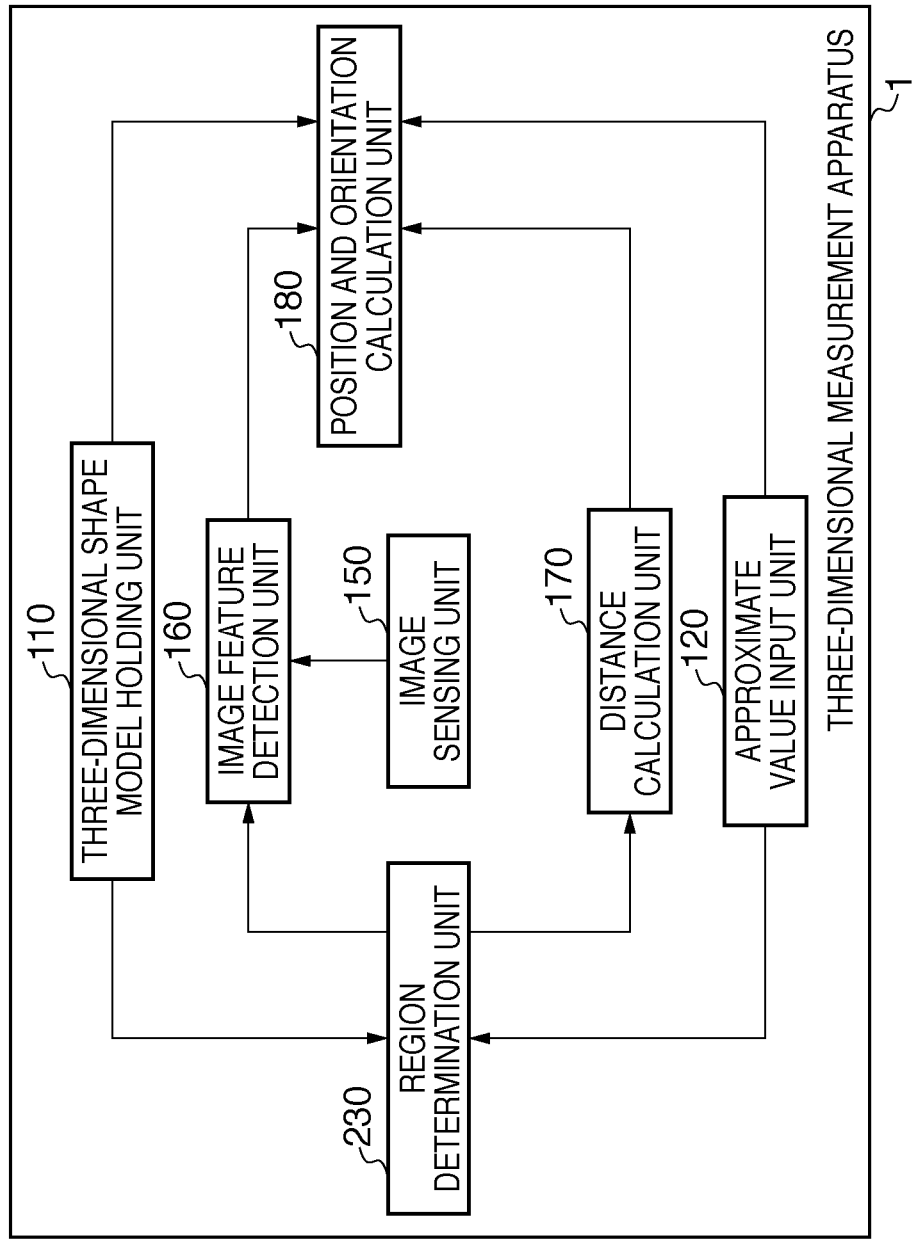
FIG. 11 is a block diagram illustrating one example of the configuration of a three-dimensional measurement apparatus 1 according to the third embodiment.

FIG. 11 illustrates one example of the configuration of a three-dimensional measurement apparatus 1 according to the third embodiment. Note that the same reference numerals as in FIG. 1 of the first embodiment denote constituent components having the same functions in the third embodiment. Attention will be focused on a difference from the first embodiment.

The three-dimensional measurement apparatus 1 includes a three-dimensional shape model holding unit 110, approximate value input unit 120, region determination unit 230, illumination unit 140, image sensing unit 150, image feature detection unit 160, distance calculation unit 170, and position and orientation calculation unit 180. That is, the illumination region determination unit 130 is omitted from the configuration in the first embodiment, and the region determination unit 230 is newly added to it.

The region determination unit 230 determines a distance measurement region (unit: pixel in this embodiment). This region is determined based on the three-dimensional shape model of the measurement object held in the three-dimensional shape model holding unit 110, and the approximate values of the position and orientation of the measurement object input by the approximate value input unit 120. That is, each region within an image sensed by the image sensing unit 150 is decided to determine a distance measurement region. Note that an image feature is detected from a region other than that determined to undergo distance measurement.

The image feature detection unit 160 detects image features representing the measurement object from the image sensed by the image sensing unit 150. Note that in the third embodiment, the image feature detection unit 160 detects image features without particularly limiting the target region. The image features detected by the image feature detection unit 160 are sorted out based on the determination result obtained by the region determination unit 230.

The distance calculation unit 170 calculates the distances of one or more points on the measurement object. At this time, using a projected image of a slit within the image sensed by irradiating the object with structured light (multi-slit light), and the geometrical relationship between the illumination unit 140 and the image sensing unit 150, the distance of the region irradiated with the slit light is calculated by triangulation. The distance calculation is performed without particularly limiting the target region. The pieces of distance information calculated by the distance calculation unit 170 are sorted out based on the determination result obtained by the region determination unit 230.

The position and orientation calculation unit 180 calculates three-dimensional information concerning the measurement object (i.e., the position and orientation of the measurement object). This three-dimensional information calculation is performed based on, for example, the image features detected by the image feature detection unit 160, and the pieces of distance information calculated by the distance calculation unit 170.

Figure 12:
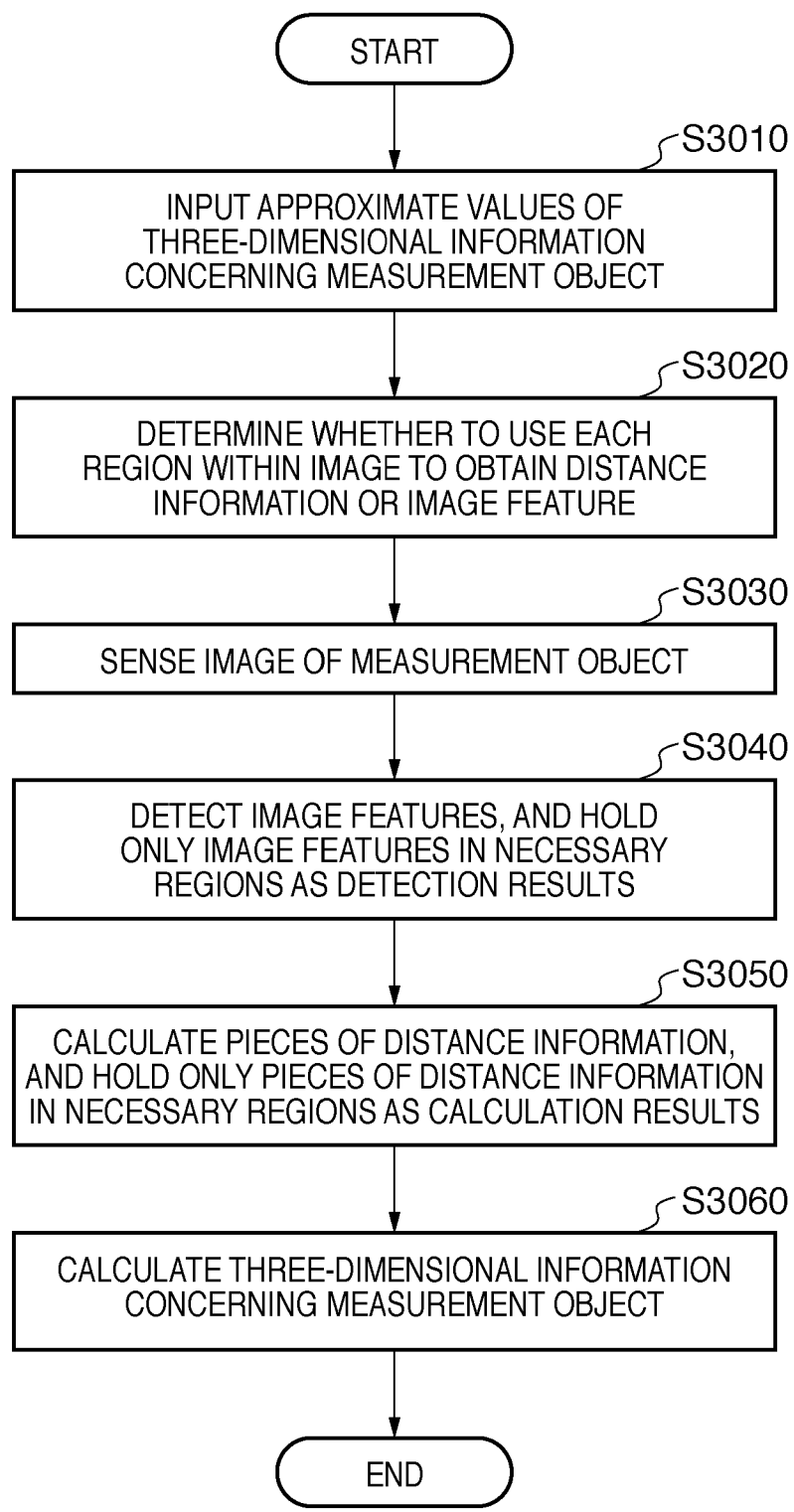
FIG. 12 is a flowchart illustrating one example of the sequence of the process of the three-dimensional measurement apparatus 1 according to the third embodiment.

One example of the sequence of a process for measuring the position and orientation of a measurement object by the three-dimensional measurement apparatus 1 according to the third embodiment will be described herein with reference to FIG. 12.

(S3010)

The three-dimensional measurement apparatus 1 uses the approximate value input unit 120 to input the approximate values of three-dimensional information concerning a measurement object (i.e., the approximate values of the position and orientation of an object with respect to the three-dimensional measurement apparatus 1). In this embodiment, the values measured in the past (e.g., the last time) for an object by the three-dimensional measurement apparatus 1 are used as the approximate values of the position and orientation of the object.

(S3020)

The three-dimensional measurement apparatus 1 uses the region determination unit 230 to determine whether to use each region within the image sensed by the image sensing unit 150 to obtain distance information or an image feature. Note that this region is determined based on the three-dimensional shape model of the measurement object held in the three-dimensional shape model holding unit 110, and the approximate values of the position and orientation of the measurement object input by the approximate value input unit 120. The region determination method is the same as in step S1020 of FIG. 3 referred to in the explanation of the first embodiment, and a detailed description thereof will not be given.

(S3030)

The three-dimensional measurement apparatus 1 uses the image sensing unit 150 to sense an image of the measurement object.

(S3040)

The three-dimensional measurement apparatus 1 detects image features based on the image sensed by the image sensing unit 150. At this time, edges are detected as the image features, as in the first embodiment. Although no edge is detected in the region (pixel) determined to undergo distance measurement in the first embodiment, the edge detection is performed from the entire image in the third embodiment. Except for this point, the edge detection in step S3040 is the same as in step S1050 of FIG. 3 referred to in the explanation of the first embodiment, and a detailed description thereof will not be given. After the edge detection is performed from the entire image, the detected edges are sorted out based on the determination result obtained by the region determination unit 230, as described earlier. In the edge sorting, when coordinates obtained by quantizing an image of each control point for each pixel correspond to the region (pixel) determined to undergo distance measurement in step S3020, the edge detection result of the corresponding pixel is deleted.

(S3050)

The three-dimensional measurement apparatus 1 uses the distance calculation unit 170 to calculate (measure) the distance of a point on the measurement object. Using a projected image of a slit within the image sensed by irradiating the object with structured light (multi-slit light), and the geometrical relationship between the illumination unit 140 and the image sensing unit 150, the distance of the region irradiated with the slit light is calculated by triangulation, as described earlier. The distance calculation is performed without particularly limiting the target region. After the distance calculation is performed over the entire image, the pieces of detected distance information are sorted out based on the determination result obtained by the region determination unit 230, as described earlier. In the distance information sorting, first, the measurement distance is transformed into three-dimensional coordinates in the coordinate system defined on the distance calculation unit 170, the obtained coordinate values are further transformed into those in the coordinate system defined on the image sensing unit 150, and the transformation result is projected onto an image. If coordinates obtained by quantizing the coordinates of the projected image for each pixel are not those of the region (pixel) whose distance information is determined to be used in step S3020, the corresponding distance measurement result is deleted.

(S3060)

The three-dimensional measurement apparatus 1 uses the position and orientation calculation unit 180 to calculate (measure) three-dimensional information concerning the measurement object (the position and orientation of the measurement object with respect to the three-dimensional measurement apparatus 1). This calculation is performed based on the image features detected in step S3040, and the pieces of distance information calculated in step S3050. The position and orientation calculation process for the measurement object is the same as in step S1070 of FIG. 3 referred to in the explanation of the first embodiment, and a detailed description thereof will not be given.

As has been described above, according to the third embodiment, it is possible to obtain the same result as in the above-described first and second embodiments without illumination control. This makes it possible to measure three-dimensional information concerning a measurement object with high accuracy free from the influence of the surface property and structure of the object, as in the first and second embodiments. Also, this does not complicate the configuration of the three-dimensional measurement apparatus.

Although the edge detection results and the distance measurement results are sorted out based on the determination result obtained by the region determination unit 230 after image feature detection and distance information calculation are performed over the entire sensed image, the present invention is not limited to this. Image features may be detected and pieces of distance information may be calculated from, for example, only necessary regions based on the determination result obtained by the region determination unit 230. This obviates the need to detect image features and calculate pieces of distance information over the entire image, so the process is expected to speed up.

Fourth Embodiment

The fourth embodiment will be described next. A case in which a distance measurement region is determined using a three-dimensional shape model of a measurement object has been explained in the above-described first to third embodiments. In contrast to this, a case in which a distance measurement region is determined without using a three-dimensional shape model of a measurement object will be explained in the fourth embodiment.

Figure 13:
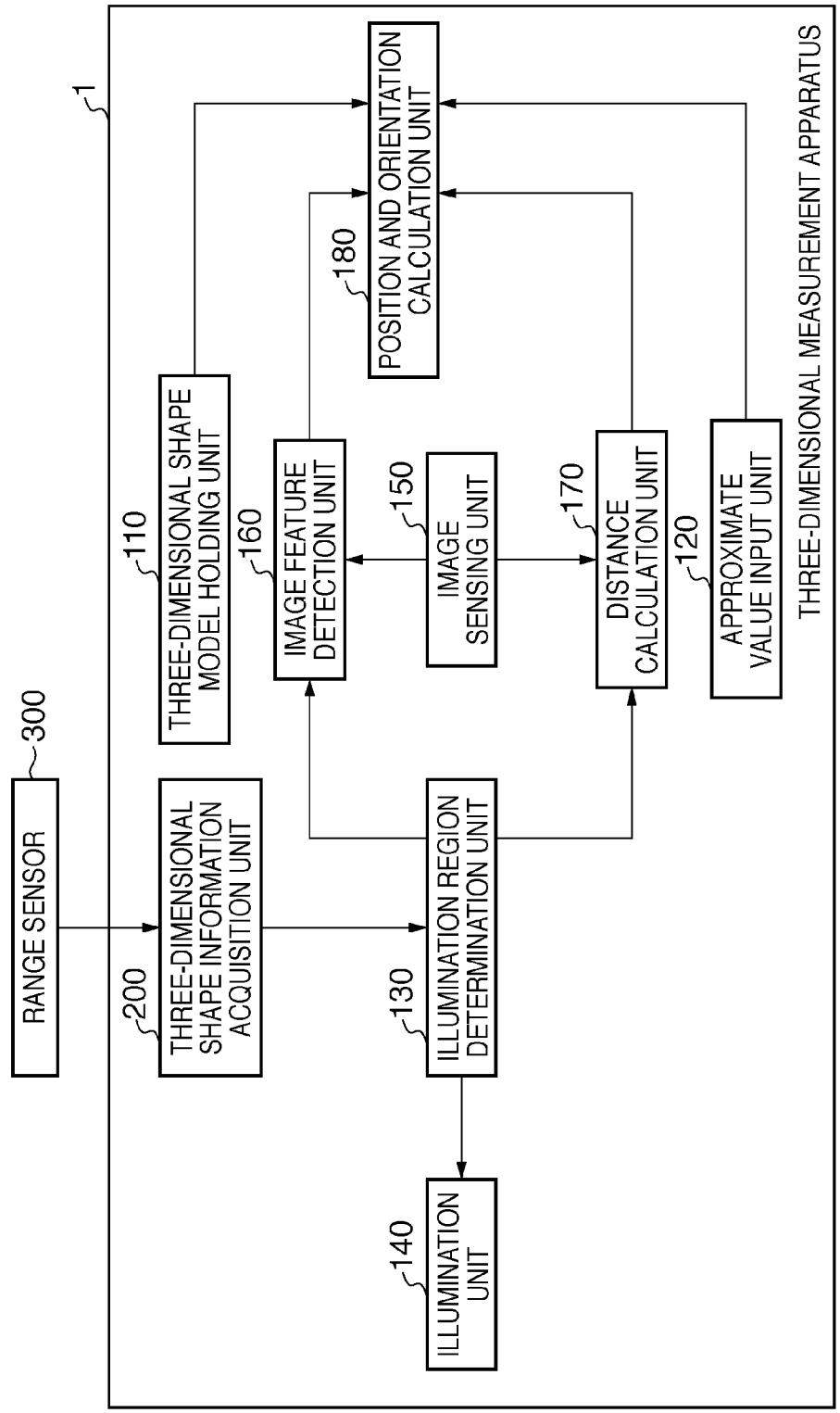
FIG. 13 is a block diagram illustrating one example of the configuration of a three-dimensional measurement apparatus 1 according to the fourth embodiment.

FIG. 13 illustrates one example of the configuration of a three-dimensional measurement apparatus 1 according to the fourth embodiment. Note that the same reference numerals as in FIG. 1 of the first embodiment denote constituent components having the same functions in the fourth embodiment. Attention will be focused on a difference from the first embodiment.

The three-dimensional measurement apparatus 1 newly includes a three-dimensional shape information acquisition unit 200, in addition to the configuration in the first embodiment. The three-dimensional shape information acquisition unit 200 is connected to an external range sensor 300.

The three-dimensional shape information acquisition unit 200 acquires information indicating the three-dimensional shape of the measurement object. In this embodiment, a range image (the three-dimensional shape of the measurement object and its vicinity) is acquired from the range sensor 300 as the information indicating the three-dimensional shape of the measurement object. The range sensor 300 is fixed in, for example, a scene. The range sensor 300 may be of an arbitrary type as long as it can measure a range image. The range sensor 300 may be of, for example, an active type in which illumination is performed during distance measurement or a passive type in which a plurality of image sensing devices are used. Alternatively, a scheme, which does not use triangulation, such as the Time-of-Flight scheme may be adopted.

Note that the values indicating the relative position and orientation between the range sensor 300 and an image sensing unit 150 are assumed to be known. When, for example, the image sensing unit 150 is placed on a robot arm, the position and orientation of the range sensor 300 in the robot coordinate system are obtained in advance. The three-dimensional measurement apparatus 1 calculates the position and orientation of the image sensing unit 150 in the robot coordinate system using the motion parameters output from the robot in measurement, and transforms them into values indicating the relative position and orientation between the range sensor 300 and the image sensing unit 150.

An illumination region determination unit 130 determines a distance measurement region based on the range image obtained from the range sensor 300. More specifically, the range image is segmented into regions based on the distance information of each pixel within the range image, and a distance measurement region is determined among the segmented regions.

Figure 14:
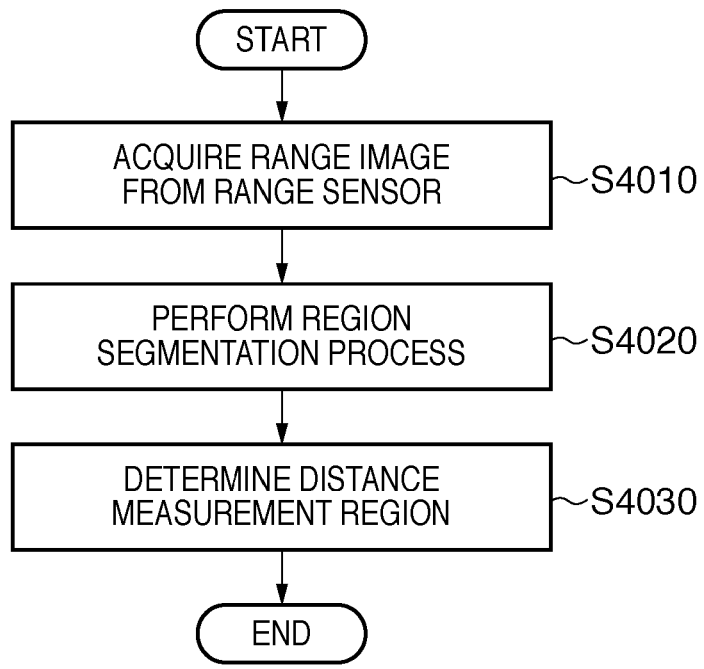
FIG. 14 is a flowchart illustrating one example of the sequence of the process of the three-dimensional measurement apparatus 1 according to the fourth embodiment.

One example of the sequence of a process for measuring the position and orientation of a measurement object by the three-dimensional measurement apparatus 1 according to the fourth embodiment will be described next with reference to FIG. 14. Note that the overall operation of the three-dimensional measurement apparatus 1 according to the fourth embodiment is the same as in FIG. 3 referred to in the explanation of the first embodiment, and only a difference from FIG. 3 (a region determination process in step S1020) will be described herein.

(S4010)

In the Region Determination Process, First, the three-dimensional measurement apparatus 1 uses the three-dimensional shape information acquisition unit 200 to acquire a range image from the range sensor 300. The range sensor 300 may acquire range images based on an instruction from the three-dimensional measurement apparatus 1, or may independently acquire range images and transfer a latest range image to the three-dimensional shape information acquisition unit 200.

(S4020)

The three-dimensional measurement apparatus 1 uses the illumination region determination unit 130 to segment the range image into regions. In the region segmentation, adjacent pixels are compared, and pixels whose distances do not largely change are grouped as one region. In this way, the range image is segmented into a plurality of regions. The region segmentation can be performed using, for example, a technique disclosed in "X. Jiang and H. Bunke, "Range Image Segmentation: Adaptive Grouping of Edges into Regions," Proc. ACCV '98, pp. 299-306, 1998." Note that a region as the distance measurement target is the one with an area greater than or equal to a predetermined area (greater than or equal to a predetermined value).

(S4030)

The three-dimensional measurement apparatus 1 uses the illumination region determination unit 130 to project the region determined as the distance measurement target in step S4020 onto a mask image with the same size as an image, sensed by the image sensing unit 150, using the values indicating the relative position and orientation between the range sensor 300 and the image sensing unit 150. Note that each pixel within the mask image is initialized to 0, and the values of pixels whose regions are projected are changed to 1, as described in the first embodiment. After the projection of all target regions is completed, the coordinates of pixels having values of 1 on the mask image are transformed into three-dimensional coordinates with reference to the image sensing unit 150 based on the pixel coordinates and the pieces of distance information. More specifically, the range image acquired by the range sensor 300 is transformed into that in the coordinate system defined on the image sensing unit 150 using the values indicating the relative position and orientation between the range sensor 300 and the image sensing unit 150. Three-dimensional coordinates are then generated (transformed) based on the coordinates and distance information in each pixel within the transformed range image. After that, the obtained three-dimensional coordinates are transformed into the coordinates of an illumination pattern (the coordinates indicating the distance measurement region) based on the values indicating the relative position and orientation between the image sensing unit 150 and an illumination unit 140, and the internal parameters of the illumination unit 140.

The three-dimensional measurement apparatus 1 uses the illumination unit 140 to irradiate the distance measurement region determined in the above-mentioned process with a predetermined illumination pattern (structured light). Note that the subsequent processes are the same as in the sequence of the first embodiment, and a description thereof will not be given.

As has been described above, according to the fourth embodiment, a distance measurement region is determined using a range image obtained from an external sensor (another viewpoint) without using a three-dimensional shape model of a measurement object. In this case as well, it is possible to obtain the same result as in the above-described first to third embodiments.

Fifth Embodiment

The fifth embodiment will be described next. A case in which a distance measurement region is calculated by automatic computation has been explained in the above-described first to fourth embodiments. In contrast to this, a case in which a distance measurement region is determined based on the manual operation of the user will be explained in the fifth embodiment. Note that the three-dimensional measurement apparatus 1 according to the fifth embodiment has the same configuration as that shown in FIG. 13 referred to in the explanation of the fourth embodiment, and an illustration thereof will not be given. A difference from the fourth embodiment will be briefly described.

In the fourth embodiment, the range image acquired by the range sensor 300 is segmented into regions, and a distance measurement region is determined. In contrast to this, in the fifth embodiment, the range image acquired by a range sensor 300 is segmented into regions, and a distance measurement region is determined based on the manual operation of the user.

Figure 15:
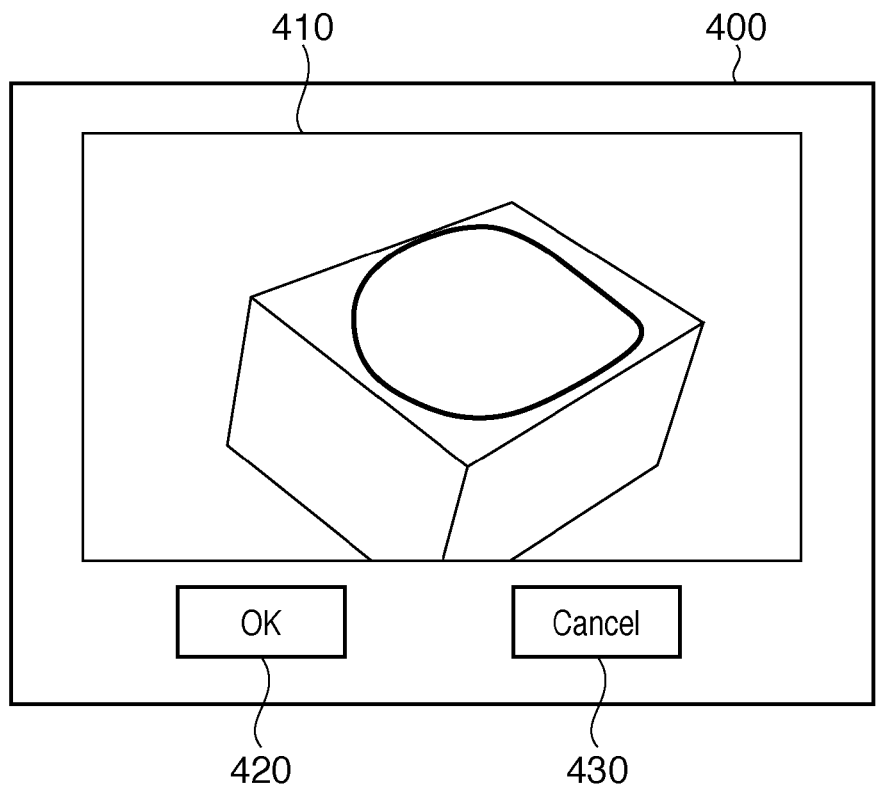
FIG. 15 is a view illustrating one example of a user interface according to the fourth embodiment.

The user performs the manual operation using, for example, a user interface 400 shown in FIG. 15. An area 410 displays the range image acquired by the range sensor 300. The user designates a distance measurement region within the area 410 using, for example, a mouse. After the designation of all regions is completed, the user presses down an OK button 420 using the mouse. In this way, the designation of the distance measurement regions by the user is completed. Note that when the user presses down a Cancel button 430, the region designation is cancelled.

When regions have been designated based on the manual operation of the user, the three-dimensional measurement apparatus 1 determines an illumination region, as in the fourth embodiment. More specifically, each region designated on the range image by the user is projected onto a mask image with the same size as an image, sensed by an image sensing unit 150, using the values indicating the relative position and orientation between the range sensor 300 and the image sensing unit 150. Note that each pixel within the mask image is initialized to 0, and the values of pixels whose regions are projected are changed to 1. After the projection of all target regions is completed, the coordinates of pixels having values of 1 within the mask image are transformed into three-dimensional coordinates with reference to the image sensing unit 150 based on the pixel coordinates and the pieces of distance information. More specifically, the range image acquired by the range sensor 300 is transformed into that in the coordinate system defined on the image sensing unit 150 using the values indicating the relative position and orientation between the range sensor 300 and the image sensing unit 150. Three-dimensional coordinates are then generated (transformed) based on the coordinates and distance information in each pixel within the transformed range image. After that, the obtained three-dimensional coordinates are transformed into the coordinates of an illumination pattern (the coordinates indicating the distance measurement region) based on the values indicating the relative position and orientation between the image sensing unit 150 and an illumination unit 140, and the internal parameters of the illumination unit 140. In this way, distance measurement regions are determined.

As has been described above, according to the fifth embodiment, a distance measurement region is determined based on the manual operation of the user. In this case as well, it is possible to obtain the same result as in the above-described first to fourth embodiments. This makes it possible to appropriately determine a distance measurement region even when an inappropriate result is obtained in an automatically performed region segmentation process.

Although one example of exemplary embodiments of the present invention has been given above, the present invention is not limited to the embodiments described above and shown in the drawings, and can be appropriately modified and carried out without departing from the scope of the invention.

First Modification

Although a case in which an object is irradiated with multi-slit light, and the distance of a region irradiated with the slit light is calculated by triangulation has been explained in the above-described first to fifth embodiments, the distance calculation method is not limited to this. For example, an object may be irradiated with an illumination pattern (e.g., a single spotlight beam or a plurality of spotlight beams, a single slit light beam, a random dot pattern, a local two-dimensional pattern, or a spatially coded pattern) other than multi-slit light, and distance may be calculated by triangulation. The "Time-of-Flight" scheme which measures distance using the time of flight from when an object is irradiated with illumination light until the light travels back, for example, may also be adopted instead of triangulation. Passive measurement in which images of a measurement object are sensed by a plurality of cameras, and distance is calculated by a stereoscopic method, for example, may be adopted instead of active measurement in which light is artificially projected onto a measurement object and distance is measured. The distance calculation method is not limited to a specific one as long as it can calculate distance with an accuracy sufficient to allow its use in calculating the position and orientation of a measurement object.

Second Modification

In the above-described first to fifth embodiments, a mask image is generated on the image surface of the image sensing unit (e.g., a camera) 150, and an illumination pattern (distance measurement region) is determined using the values indicating the relative position and orientation between the image sensing unit 150 and the illumination unit 140. However, the method of determining a distance measurement region (the method of generating an illumination pattern) is not limited to this. An illumination pattern may be generated by, for example, transforming the approximate values of the position and orientation of a measurement object with respect to an image sensing unit 150 into its position and orientation with reference to an illumination unit 140, and directly projecting a three-dimensional shape model or a region segmentation result onto an image corresponding to the illumination pattern. In this case, a three-dimensional shape model or a region segmentation result need only be projected onto an image using the relative position and orientation between the image sensing unit 150 and the illumination unit 140, and the internal parameters of the illumination unit 140 calibrated in advance.

Third Modification

In the above-described first to third embodiments, a three-dimensional shape model is projected onto an image based on the approximate values of the position and orientation of a measurement object, and a distance measurement region or a region whose distance measurement result is to be used is determined based on the obtained projection result. However, this process may be modified and performed. These regions may be determined in consideration of the measurement accuracy of the position and orientation of the measurement object or its motion. The covariance matrix of the position and orientation of an object obtained by inputting the position and orientation of the object, measured using a Kalman filter, as time-series data, for example, may be adopted as an accuracy index. That is, in projecting the end points of line segments which form a three-dimensional shape model, a region (elliptical region) on an image corresponding to a predetermined range (e.g., $3\sigma$) of a covariance matrix is calculated, and a region including an elliptical region defined by two end points is set for each line segment. The distance is not measured in the region including the elliptical region, or the distance measurement result in that region is not used. Alternatively, the current position and orientation of an object may be predicted based on the difference between the current time and the time at which the approximate values of the position and orientation of the object are obtained, by estimating the velocity/angular velocity of the object using a Kalman filter in the same way, and the above-mentioned region determination process may be performed based on the prediction results.

Fourth Modification

Although a case in which an edge is detected as the image feature has been explained in the above-described first and third to fifth embodiments, the image feature is not limited to an edge. The position and orientation of an object may be calculated by detecting, for example, a feature point from an image using a Harris detector, and fitting a point in a three-dimensional shape model to the detected feature point, as disclosed in Reference 1. In this case, information regarding the feature point is used to determine a distance measurement region (illumination region). More specifically, a feature point is detected from the image sensed in the past, and the position and orientation of the object are calculated based on the detection result of the feature point. A three-dimensional shape model is projected onto an image based on the calculation result, and a feature point present on the projected image is selected. The illumination pattern (distance measurement region) is changed so that positions at a predetermined distance or less from the image coordinate of the selected feature point are not irradiated.

Fifth Modification

In the above-described first to fifth embodiments, a region where an image feature such as an edge or a feature point is easy to detect is decided, and a region other than the determined region is determined as a distance measurement region. However, the method of determining an illumination region is not limited to this. Regions where changes in density are small may be decided first, and the decided regions may be determined as distance measurement regions. That is, each plane which forms a three-dimensional shape model may be rendered based on the approximate values of the position and orientation of an object, and these regions may be determined to be irradiated with distance measurement light. Also, information as to whether a change in density is small may be imparted in advance to each plane which forms a three-dimensional shape model. In this case, a three-dimensional shape model is rendered based on the approximate values of the position and orientation of an object, and it is determined that a region corresponding to a plane where a change in density is small is irradiated with distance measurement light. The foregoing description is concerned with modifications.

The present invention can also be practiced as, for example, a system, apparatus, method, program, or recording medium. More specifically, the present invention may be applied to a system formed from a plurality of devices, or an apparatus formed from only one device.

According to the present invention, it is possible to measure the position and orientation of a measurement object with high accuracy without complicating the configuration of a three-dimensional measurement apparatus even when the position and orientation relationship between the apparatus and the object changes at a high rate.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-150323, filed on Jun. 24, 2009 which is hereby incorporated by reference herein in its entirety.

What is claimed is:

1. An apparatus comprising:
an input unit configured to input an approximate position and orientation of a measurement object;
an acquisition unit configured to acquire a three-dimensional shape model of the measurement object;
a generation unit configured to generate mask information which indicates a surface of the measurement object based on the approximate position and orientation of the measurement object and the three-dimensional shape model of the measurement object;
a determination unit configured to determine a distance measurement region on the measurement object based on the mask information;
an illumination unit configured to irradiate the determined distance measurement region on the measurement object with a predetermined illumination pattern;
an image sensing unit configured to sense an image of the measurement object while said illumination unit irradiates the measurement object;
a calculation unit configured to calculate three-dimensional coordinate information of the measurement object based on a first region corresponding to the distance measurement region within the sensed image;
a detection unit configured to detect an image feature from a second region within the sensed image, wherein the second region is different from the first region;
a first association unit configured to associate the detected image feature with a first feature of the three-dimensional shape model having the approximate position and orientation;
a second association unit configured to associate the three-dimensional coordinate information with a second feature of the three-dimensional shape model having the approximate position and orientation, wherein the second feature is different from the first feature; and
a position and orientation calculation unit configured to calculate a position and orientation of the measurement object based on the association results by said first and second association units.

2. The apparatus according to claim 1, wherein detection of the image features by said detection unit and calculation of the three-dimensional coordinate information by said calculation unit are executed based on a single sensed image.

3. The apparatus according to claim 1, wherein said determination unit determines the distance measurement region based on a region with an area of not less than a predetermined value among regions into which a range image including the measurement object represented by the mask information is segmented.

4. The apparatus according to claim 1, wherein said determination unit determines a region, where a change in density is estimated to be small, on the measurement object as the distance measurement region.

5. The apparatus according to claim 1, wherein said illumination unit irradiates only the determined distance measurement region on the measurement object with the predetermined illumination pattern.

6. The apparatus according to claim 1, wherein the first feature of the three-dimensional shape model is an edge of the three-dimensional shape model and the second feature of the three-dimensional shape model is a point on a surface of the three-dimensional shape model.

7. The apparatus according to claim 1, wherein said generation unit generates the mask information by projecting the three-dimensional shape model using the approximate position and orientation.

8. An apparatus comprising:
an input unit configured to input an approximate position and orientation of a measurement object;
an acquisition unit configured to acquire a three-dimensional shape model of the measurement object and a range image including the measurement object, which is acquired by a range sensor;
a generation unit configured to generate mask information which indicates a surface of the measurement object based on the range image;
a determination unit configured to determine a distance measurement region on the measurement object based on the mask information;
an illumination unit configured to irradiate the distance measurement region determined by said determination unit with a predetermined illumination pattern;
an image sensing unit configured to sense an image of the measurement object while said illumination unit irradiates the measurement object;

a calculation unit configured to calculate three-dimensional coordinate information of the measurement object based on a first region corresponding to the distance measurement region within the sensed image;

a detection unit configured to detect an image feature from a second region within the sensed image, wherein the second region is different from the first region;

a first association unit configured to associate the detected image feature with a first feature of the three-dimensional shape model having the approximate position and orientation;

a second association unit configured to associate the three-dimensional coordinate information with a second feature of the three-dimensional shape model having the approximate position and orientation, wherein the second feature is different from the first feature; and a position and orientation calculation unit configured to calculate the position and orientation of the measurement object based on the association results by said first and second association units, wherein said determination unit segments the range image into regions based on distance information of each pixel within the distance image, and determines the range measurement region based on an image, obtained by projecting one of the segmented regions, using values indicating a relative position and orientation between the range sensor and said image sensing unit.

9. A measurement method which measures a position and orientation of a measurement object using a three-dimensional shape model of the measurement object from a memory, the method comprising:

inputting an approximate position and orientation of the measurement object;

generating mask information which indicates a surface of the measurement object based on the approximate position and orientation of the measurement object and the three-dimensional shape model of the measurement object;

determining a distance measurement region on the measurement object based on the mask information;

irradiating the determined distance measurement region on the measurement object with a predetermined illumination pattern;

sensing an image of the measurement object by an image sensing unit while the illumination unit irradiates the measurement object;

calculating three-dimensional coordinate information to the measurement object based on a first region corresponding to the distance measurement region within the sensed image;

detecting an image feature from a second region within the sensed image, wherein the second region is different from the first region;

associating the detected image feature with a first feature of the three-dimensional shape model having the approximate position and orientation;

associating the three-dimensional coordinate information with a second feature of the three-dimensional shape model having the approximate position and orientation, wherein the second feature is different from the first feature; and calculating the position and orientation of the measurement object based on the association results.

10. A non-transitory computer-readable storage medium storing a computer program for causing a computer to function as:

an input unit configured to input an approximate position and orientation of a measurement object;

an acquisition unit configured to acquire a three-dimensional shape model of the measurement object;

a generation unit configured to generate mask information which indicates a surface of the measurement object based on the approximate position and orientation of the measurement object and the three-dimensional shape model of the measurement object;

a determination unit configured to determine a distance measurement region on the measurement object based on the mask information;

a determination unit configured to determine a distance measurement region on the measurement object based on the mask information;

an illumination unit configured to irradiate the determined distance measurement region on the measurement object with a predetermined illumination pattern;

an image sensing unit configured to sense an image of the measurement object while the illumination unit irradiates the measurement object;

a calculation unit configured to calculate three-dimensional coordinate information of to the measurement object based on a first region corresponding to the distance measurement region within the sensed image;

a detection unit configured to detect an image feature from a second region within the sensed image, wherein the second region is different from the first region;

a first association unit configured to associate the detected image feature with a first feature of the three-dimensional shape model having the approximate position and orientation;

a second association unit configured to associate the three-dimensional coordinate information with a second feature of the three-dimensional shape model having the approximate position and orientation, wherein the second feature is different from the first feature; and a position and orientation calculation unit configured to calculate a position and orientation of the measurement object based on the association results by said first and second association units.

11. An apparatus comprising:

an input unit configured to input an approximate position and orientation of a measurement object;

an acquisition unit configured to acquire a three-dimensional shape model of the measurement object;

a generation unit configured to generate mask information which indicates a surface of the measurement object based on the approximate position and orientation of the measurement object and the three-dimensional shape model of the measurement object;

a determination unit configured to determine a distance measurement region on the measurement object based on the mask information;

an illumination unit configured to irradiate the measurement object with a predetermined illumination pattern;

an image sensing unit configured to sense an image of the measurement object while said illumination unit irradiates the measurement object;

a calculation unit configured to calculate three-dimensional coordinate information of the measurement object based on a first region corresponding to the distance measurement region within the sensed image;

a detection unit configured to detect an image feature from an entire sensed image and select an image feature in a second region other than the first region from the detected image feature, by referring to the mask information;

a first association unit configured to associate the selected image feature with a first feature of the three-dimensional shape model having the approximate position and orientation;

a second association unit configured to associate the three-dimensional coordinate information with a second feature of the three-dimensional shape model having the approximate position and orientation, wherein the second feature is different from the first feature; and a position and orientation calculation unit configured to calculate a position and orientation of the measurement object based on the association results by said first and second association units.

12. A method comprising:

an input step of inputting an approximate position and orientation of a measurement object;

an acquisition step of acquiring a three-dimensional shape model of the measurement object;

a generation step of generating mask information which indicates a surface of the measurement object based on the approximate position and orientation of the measurement object and the three-dimensional shape model of the measurement object;

a determination step of determining a distance measurement region on the measurement object based on the mask information;

an illumination step of irradiating, with an illumination unit, the measurement object with a predetermined illumination pattern;

an image sensing step of sensing an image of the measurement object while the illumination step irradiates the measurement object;

a calculation step of calculating three-dimensional coordinate information of the measurement object based on a first region corresponding to the distance measurement region within the sensed image;

a detection step of detecting an image feature from an entire sensed image and select an image feature in a second region other than the first region from the detected image feature, by referring to the mask information;

a first association step of associating the selected image feature with a first feature of the three-dimensional shape model having the approximate position and orientation;

a second association step of associating the three-dimensional coordinate information with a second feature of the three-dimensional shape model having the approximate position and orientation, wherein the second feature is different from the first feature; and a position and orientation calculation step of calculating a position and orientation of the measurement object based on the association results by said first and second association steps.

* * * * *